(12) United States Patent
Magpayo et al.

(10) Patent No.: US 11,838,525 B2
(45) Date of Patent: Dec. 5, 2023

(54) IMAGE COMPRESSION CIRCUITRY AND IMAGE COMPRESSION METHOD

(71) Applicant: Synaptics Incorporated, San Jose, CA (US)

(72) Inventors: Micael Lacson Magpayo, Tokyo (JP); Hirobumi Furihata, Tokyo (JP); Takashi Nose, Tokyo (JP)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 17/852,340

(22) Filed: Jun. 28, 2022

(65) Prior Publication Data

US 2022/0329838 A1 Oct. 13, 2022

Related U.S. Application Data

(63) Continuation of application No. 16/589,950, filed on Oct. 1, 2019, now Pat. No. 11,418,801.

(30) Foreign Application Priority Data

Oct. 5, 2018 (JP) .................................. 2018-190483

(51) Int. Cl.
*H04N 19/42* (2014.01)
*H04N 19/176* (2014.01)
(Continued)

(52) U.S. Cl.
CPC .......... *H04N 19/439* (2014.11); *H04N 19/176* (2014.11); *H04N 19/423* (2014.11); *H04N 19/70* (2014.11)

(58) Field of Classification Search
None
See application file for complete search history.

(56) References Cited

U.S. PATENT DOCUMENTS

| 2008/0175498 A1 | 7/2008 | Lee et al. |
| 2015/0215618 A1 | 7/2015 | Bretscher |

(Continued)

FOREIGN PATENT DOCUMENTS

| JP | 11-75201 A | 3/1999 |
| JP | 2008-178109 A | 7/2008 |

(Continued)

OTHER PUBLICATIONS

Sullivan et al., "Overview of the High Efficiency Video Coding (HEVC) Standard." IEEE Transactions on Circuits and Systems for Video Technology, vol. 22, No. 12, Dec. 1, 2021, 20 pages.

(Continued)

*Primary Examiner* — Christopher Braniff
(74) *Attorney, Agent, or Firm* — Leydig, Voit & Mayer, Ltd.

(57) ABSTRACT

Image compression circuitry comprises first-stage compression circuitry, first-stage selector circuitry, second-stage compression circuitry, and second-stage selector circuitry. The first-stage compression circuitry is configured to sequentially receive a plurality of input blocks each comprising pixel data of a plurality of pixels, generate a plurality of first-stage compressed blocks by compressing the plurality of input blocks, and generate a plurality of first-stage decompressed blocks. The first-stage selector circuitry is configured to select first-stage-selected decompressed blocks from among the plurality of first-stage decompressed blocks and select first-stage-selected compressed blocks corresponding to the first-stage-selected decompressed blocks from among the plurality of first-stage compressed blocks. The second-stage compression circuitry is configured to generate a plurality of second-stage compressed blocks by compressing the plurality of input blocks and generate a plurality of second-stage decompressed blocks.

(Continued)

The second-stage selector circuitry is configured to select second-stage-selected compressed and output the second-stage-selected compressed blocks.

26 Claims, 20 Drawing Sheets

(51) Int. Cl.
*H04N 19/423* (2014.01)
*H04N 19/70* (2014.01)

(56) References Cited

U.S. PATENT DOCUMENTS

2016/0322010 A1   11/2016   Amino
2017/0293823 A1   10/2017   Furihata et al.
2017/0332090 A1   11/2017   Furihata et al.
2019/0213440 A1   7/2019    Furihata et al.

FOREIGN PATENT DOCUMENTS

JP   2017-191413 A   10/2017
JP   2017-204811 A   11/2017

OTHER PUBLICATIONS

Notice of Reasons for Refusal, with Translation for Japanese Patent Application No. 20189-190483, dated Nov. 16, 2022, 6 pages.

F I G. 5
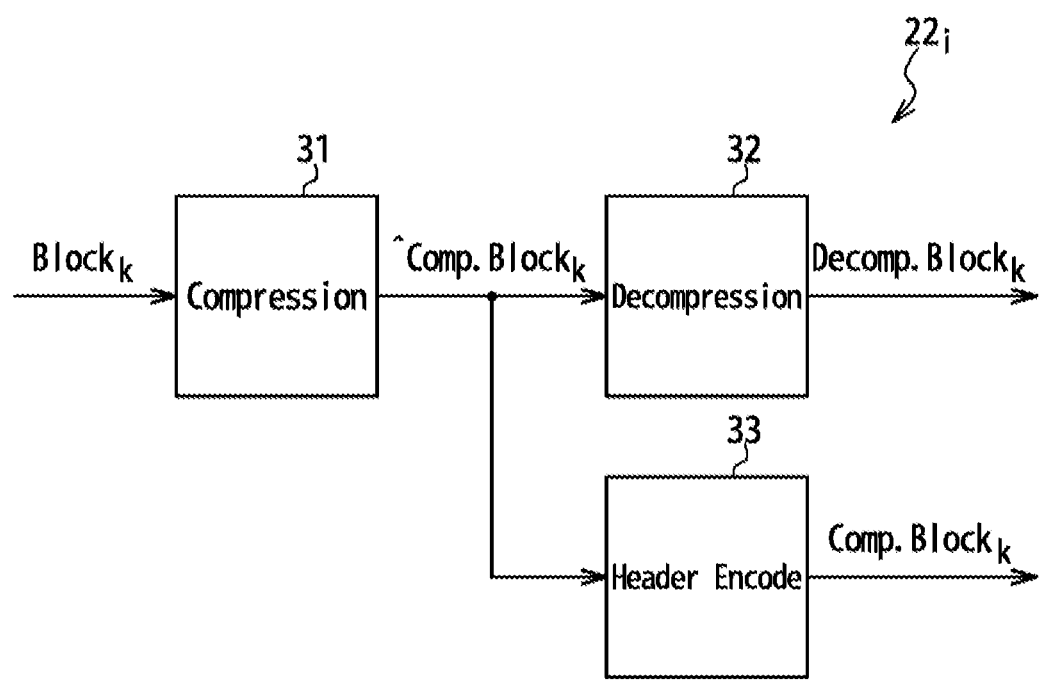

F I G. 12
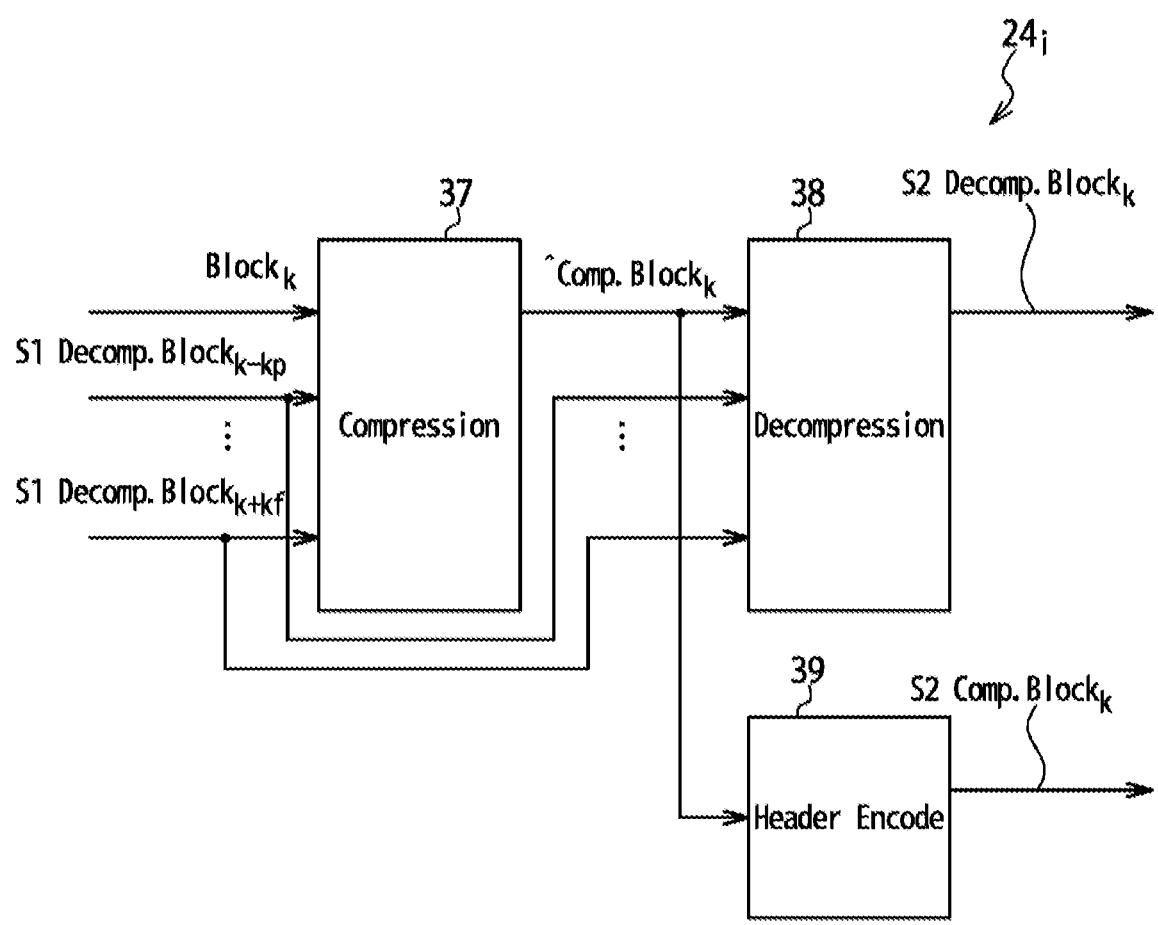

US 11,838,525 B2

IMAGE COMPRESSION CIRCUITRY AND IMAGE COMPRESSION METHOD

CROSS REFERENCE

This application is a continuation of, and thereby claims benefit under 35 U.S.C. § 120 to, U.S. patent application Ser. No. 16/589,950 filed on Oct. 1, 2019. U.S. patent application Ser. No. 16/589,950 claims priority to Japanese Patent Application No. 2018-190483, filed on Oct. 5, 2018, the disclosure of which is incorporated herein by reference in its entirety.

BACKGROUND

Field

The present disclosure relates to image data compression.

Description of the Related Art

A system configured to display an image may perform compression and decompression of image data. An image compression scheme used in such a system may be designed to improve the compression ratio with reduced compression distortion.

SUMMARY

In one or more embodiments, image compression circuitry comprises first-stage compression circuitry configured to sequentially receive a plurality of input blocks each comprising pixel data of a plurality of pixels, generate a plurality of first-stage compressed blocks by compressing the plurality of input blocks through a plurality of first-stage compression methods, and generate a plurality of first-stage decompressed blocks by decompressing the plurality of first-stage compressed blocks. The first-stage selector circuitry is configured to select first-stage-selected decompressed blocks from among the plurality of first-stage decompressed blocks and select first-stage-selected compressed blocks corresponding to the first-stage-selected decompressed blocks from among the plurality of first-stage compressed blocks. The second-stage compression circuitry configured to generate a plurality of second-stage compressed blocks by compressing the plurality of input blocks through a plurality of second-stage compression methods and generate a plurality of second-stage decompressed blocks by decompressing the plurality of second-stage compressed blocks. The second-stage selector circuitry is configured to select second-stage-selected compressed blocks from among the first-stage-selected compressed blocks and the plurality of second-stage compressed blocks and output the second-stage-selected compressed blocks.

In one or more embodiments, image compression circuitry comprises first-stage compression circuitry configured to sequentially receive a plurality of input blocks each comprising pixel data of a plurality of pixels, generate a plurality of first-stage compressed blocks by compressing the plurality of input blocks, and generate a plurality of first-stage decompressed blocks by decompressing the plurality of first-stage compressed blocks. The image compression circuitry further comprises second-stage compression circuitry configured to sequentially receive the plurality of input blocks and generate a plurality of second-stage compressed blocks by compressing the plurality of input blocks. The second-stage compression circuitry is further configured to generate one of the second-stage compressed blocks which corresponds to a first input block of the plurality of input blocks based on a first one of the plurality of first-stage decompressed blocks which corresponds to a preceding input block of the plurality of input blocks and a second one of the plurality of first-stage decompressed blocks which corresponds to a following input block of the plurality of input blocks, the preceding input block being inputted to the first-stage compression circuitry just before the first input block, and the following input block being inputted to the first-stage compression circuitry just after the first input block.

In one or more embodiments, an image compression method comprises sequentially receiving a plurality of input blocks each comprising pixel data of a plurality of pixels, generating a plurality of first-stage compressed blocks by compressing the plurality of input blocks through a plurality of first-stage compression methods, and generating a plurality of first-stage decompressed blocks by decompressing the plurality of first-stage compressed blocks. The method further comprises selecting first-stage-selected decompressed blocks from among the plurality of first-stage decompressed blocks, selecting first-stage-selected compressed blocks corresponding to the first-stage-selected decompressed blocks from among the plurality of first-stage compressed blocks, and generating a plurality of second-stage compressed blocks by compressing the plurality of input blocks through a plurality of second-stage compression methods. Further, the method comprises generating a plurality of second-stage decompressed blocks by decompressing the plurality of second-stage compressed blocks, selecting second-stage-selected compressed blocks from among the first-stage-selected compressed blocks and the plurality of second-stage compressed blocks based on the first-stage-selected decompressed blocks and the plurality of second-stage decompressed blocks, and outputting the second-stage-selected compressed blocks.

BRIEF DESCRIPTION OF THE DRAWINGS

So that the manner in which the above recited features of the present disclosure may be understood in detail, a more particular description of the disclosure, briefly summarized above, may be had by reference to embodiments, some of which are illustrated in the appended drawings. It is to be noted, however, that the appended drawings illustrate only some embodiments of this disclosure and are therefore not to be considered limiting of its scope, for the disclosure may admit to other equally effective embodiments.

FIG. 5 illustrates one example configuration of a first-stage compression submodule, according to one or more embodiments.

FIG. 12 illustrates one example configuration of a second-stage compression submodule, according to one or more embodiments.

DETAILED DESCRIPTION

Figure 1:
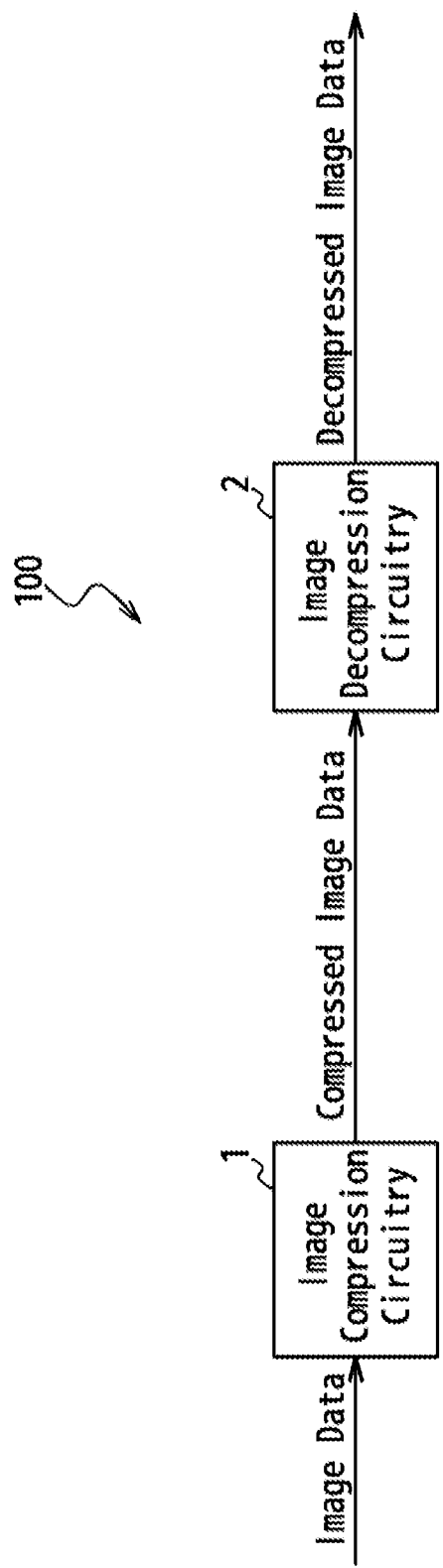
FIG. 1 illustrates one example configuration of an image data compression/decompression system, according to one or more embodiments.

In one or more embodiments, as illustrated in FIG. 1, an image data compression/decompression system 100 comprises image compression circuitry 1 and image decompression circuitry 2. In one or more embodiments, the image compression circuitry 1 is configured to compress an image data to generate a compressed image data. In one or more embodiments, the image decompression circuitry 2 is configured to decompress the compressed image data to generate a decompressed image data. In one or more embodiments, the image compression circuitry 1 and the image decompression circuitry 2 may be integrated in a single integrated circuit or in separate integrated circuits.

Figure 2:
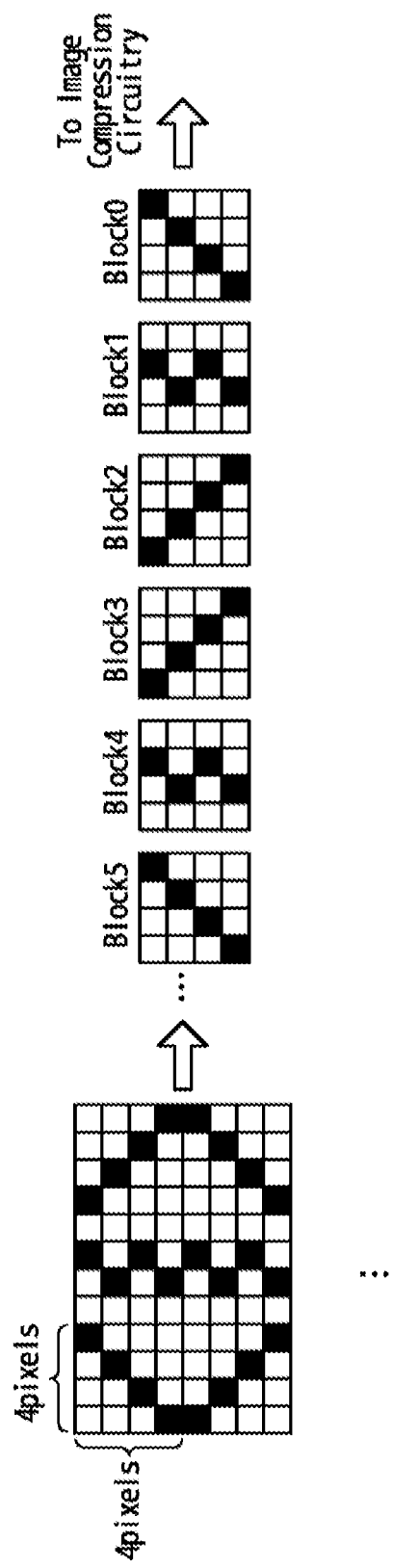
FIG. 2 illustrates example blocks, according to one or more embodiments.

In one or more embodiments, the image compression circuitry 1 is configured to perform block compression, and an image data supplied to the image compression circuitry 1 comprises a plurality of blocks as illustrated in FIG. 2. In one or more embodiments, each block comprises pixel data associated with a plurality of pixels. In one or more embodiments, the pixel data of each pixel is described in an RGB format and comprises an R component (R grayscale value), a G component (G grayscale value), and a B component (B grayscale value.)

In one or more embodiments, as illustrated in FIG. 2, a block comprises pixel data associated with pixels in four rows and four columns (4×4 pixels). In one or more embodiments, the blocks are supplied to the image compression circuitry 1 in a raster order, for example. In the following, a block inputted to the image compression circuitry 1 may be referred to as input block, and the $k^{th}$ input block inputted to the image compression circuitry 1 may be denoted by the symbol "$Block_k$."

Figure 3:
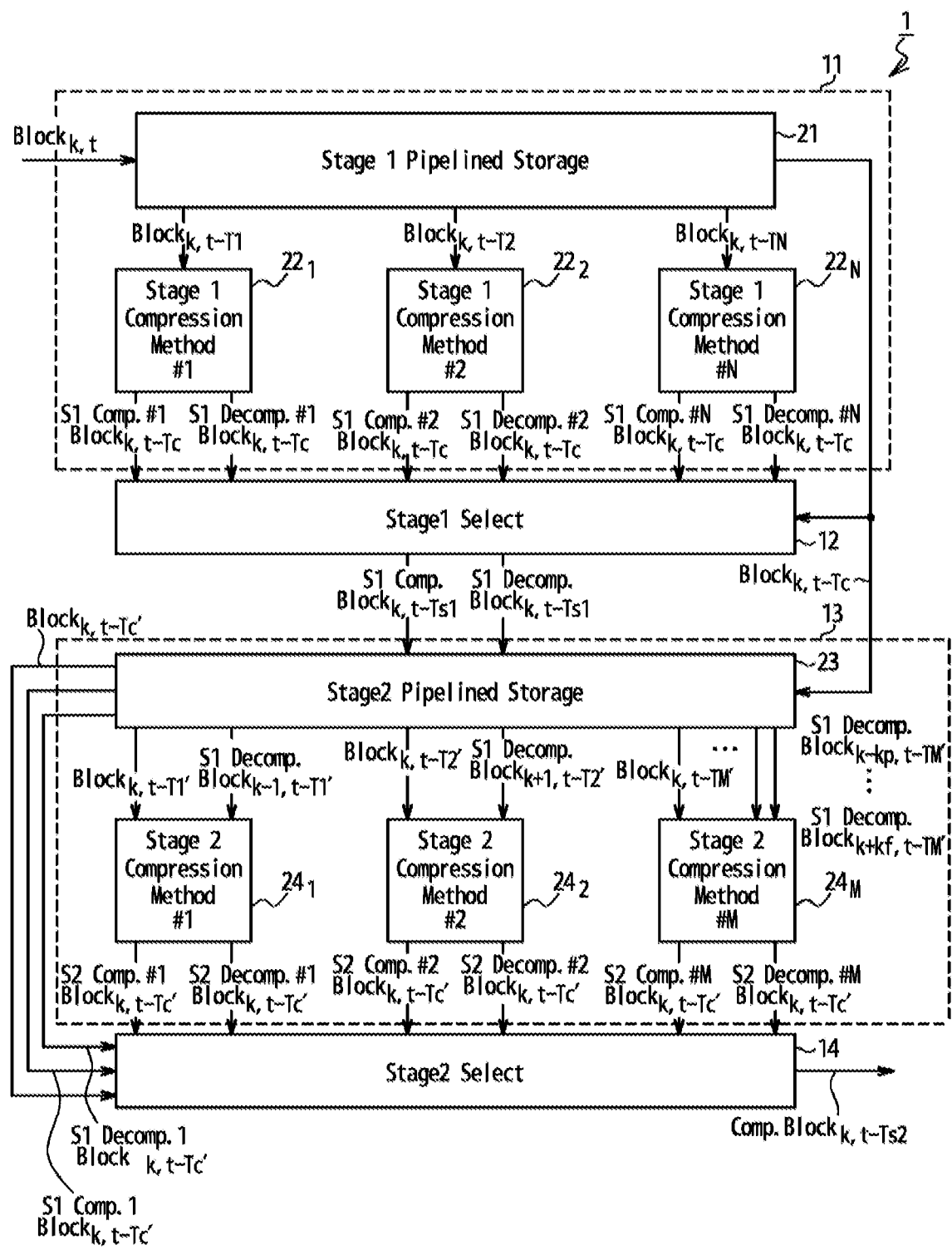
FIG. 3 illustrates one example configuration of image compression circuitry, according to one or more embodiments.

In one or more embodiments, as illustrated in FIG. 3, the image compression circuitry 1 comprises first-stage compression circuitry 11, first-stage selector circuitry 12, second-stage compression circuitry 13, and second-stage selector circuitry 14.

In one or more embodiments, the first-stage compression circuitry 11 comprises a pipelined storage 21 and N first-stage compression submodules $22_1$ to $22_N$. In alternative embodiments, the pipelined storage 21 may be disposed separately from the first-stage compression circuitry 11.

Figure 4A:
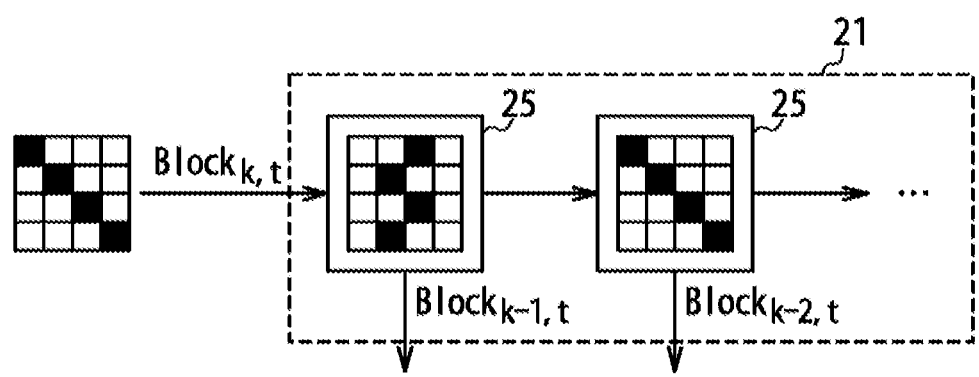
FIG. 4A illustrates one example configuration and operation of a pipelined storage, according to one or more embodiments.
Figure 4B:
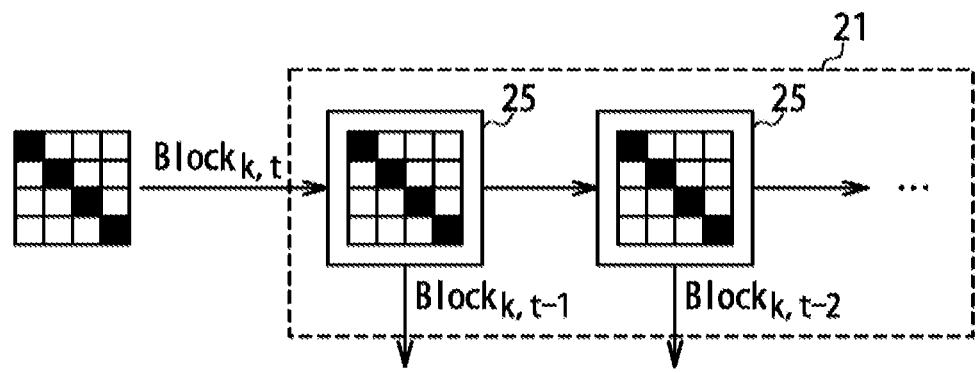
FIG. 4B illustrates one example operation of the pipelined storage, according to one or more embodiments.

In one or more embodiments, the pipelined storage 21 is configured to distribute the input blocks sequentially supplied thereto to the first-stage compression submodules $22_1$ to $22_N$. In one or more embodiments, as illustrated in FIG. 4A, the pipelined storage 21 comprises serially-connected memory elements 25. In one or more embodiments, each memory element 25 is configured to store one block. In one or more embodiments, when the $k^{th}$ input block $Block_k$ is inputted to the pipelined storage 21 at the time t, the $(k-1)^{th}$ input block $Block_{k-1}$ is outputted from the memory element 25 of the first stage, the $(k-2)^{th}$ input block $Block_{k-2}$ is outputted from the memory element 25 of the second stage. In one or more embodiments, as illustrated in FIG. 4B, the $k^{th}$ input block $Block_k$ is outputted from the memory element 25 of the first stage after one unit time has elapsed from the time t, and then outputted from the memory element 25 of the second stage after two unit times have elapsed from the time t. In one or more embodiments, the unit time is, for example, the periodicity of the clock used for achieving synchronization in the image compression circuitry 1. In FIGS. 4A and 4B and other drawings, the symbol "$Block_{k,t-X}$" indicates the $k^{th}$ input block when X unit times have elapsed after the time t.

Referring back to FIG. 3, in one or more embodiments, the first-stage compression submodules $22_1$ to $22_N$ are configured to generate compressed blocks by compressing the input blocks sequentially supplied thereto with compression methods different from one another and further generate decompressed blocks by decompressing the compressed blocks. The compression method used by the first-stage compression submodule $22_i$ may be hereinafter referred to as "stage-1 compression method #i."

In one or more embodiments, the first-stage compression submodules $22_1$ to $22_N$ have a common structure illustrated in FIG. 5. In one or more embodiments, each first-stage compression submodule $22_i$ comprises a compression stage 31, a decompression stage 32, and a header encoder 33. In one or more embodiments, the compression stage 31 is configured to generate a compressed block ^Comp. $Block_k$ by compressing each input block $Block_k$. In one or more embodiments, the decompression stage 32 is configured to generate a decompressed block Decomp. $Block_k$ by decompressing the compressed block ^Comp. $Block_k$ generated by the compression stage 31. In one or more embodiments, the header encoder 33 is configured to generate a compressed block Comp. $Block_k$ to be finally outputted to the first-stage selector circuitry 12 by attaching a header to the compressed block ^Comp. $Block_k$.

Figure 6:
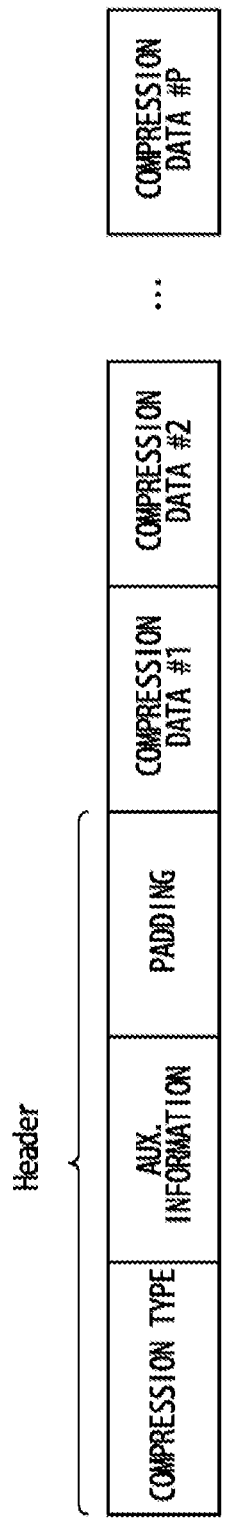
FIG. 6 illustrates one example configuration of a compressed block, according to one or more embodiments.

In one or more embodiments, as illustrated in FIG. 6, the compressed block Comp. $Block_k$, which is outputted from the header encoder 33, comprises a header and compassion data #1 through #P. In one or more embodiments, the header comprises compression type information identifying the compression method and auxiliary information used in decompression processing. The header may further comprise a padding. In one or more embodiments, the compression data #1 through #P are data constituting the compressed block ^Comp. Block$_k$ generated by the compression stage 31.

In one or more embodiments, stage-1 compression methods #1 to #N are configured to generate compressed blocks by individually compressing respective input blocks. In one or more embodiments, stage-1 compression methods #1 to #N are configured to, when generating a compressed block from an input block, generate the compressed block without using information of other input blocks.

In one or more embodiments, pixel data of each pixel describes R, G, and B components with eight bits. In one or more embodiments, a compressed block comprises, for example, a 6-bit data for each pixel. In such embodiments, each input block is compressed into a compressed block having a size of one fourth of the original size.

Figure 7:
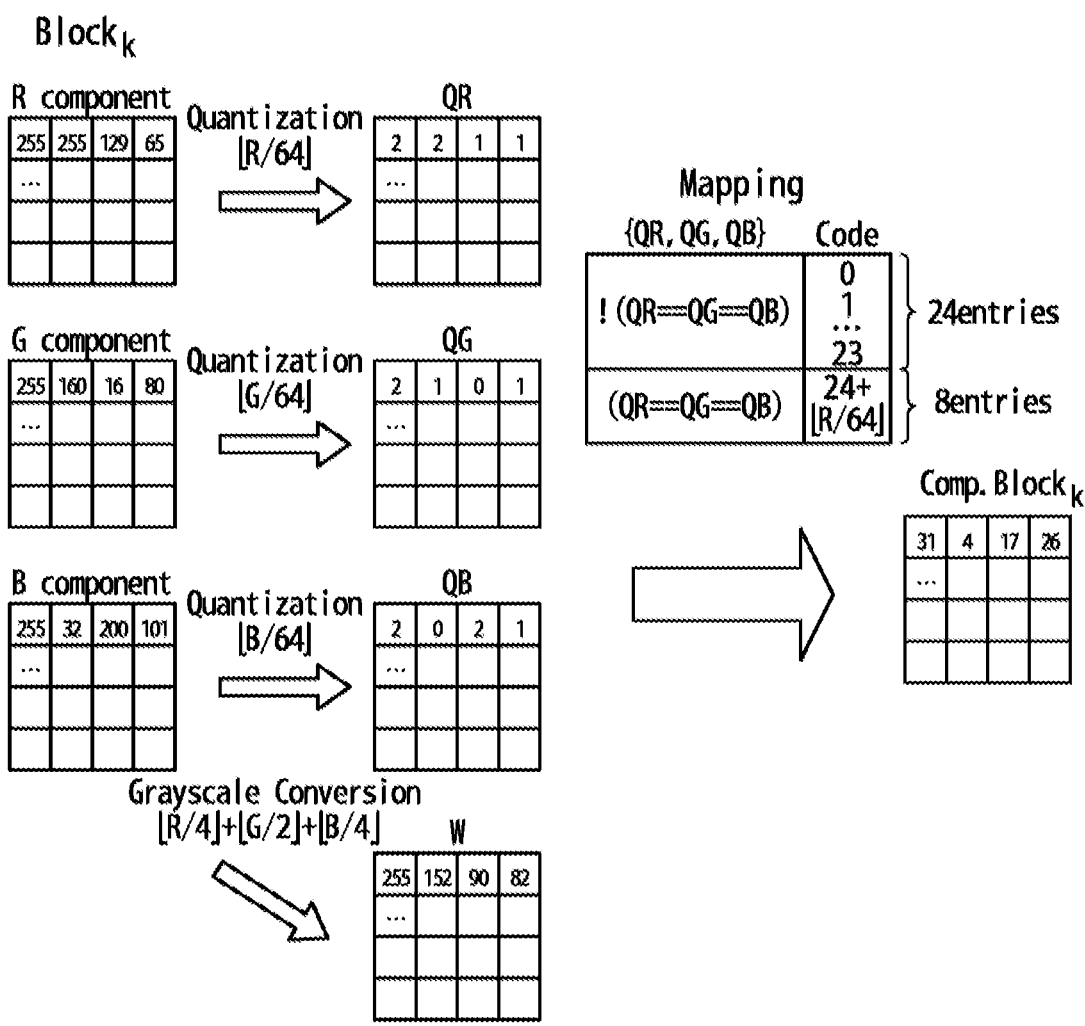
FIG. 7 illustrates Color 32 compression, according to one or more embodiments.

In one or more embodiments, Color32 compression illustrated in FIG. 7 is used as one of stage-1 compression methods #1 to #N. In one or more embodiments, Color32 compression encodes pixel data of each pixel with a five-bit value for each of R, G, and B components based on relative intensities of the R, G, and B components. In one or more embodiments, Color32 compression compresses the respective input block individually, not using information of other input blocks when generating a compressed block from an input block.

In one or more embodiments, Color32 compression first performs quantization of R, G, and B components of pixel data of respective pixels included in the input block. In one or more embodiments, as illustrated in FIG. 7, the quantization is achieved by dividing the R, G, and B components by 64. In one or more embodiments, the quantized R, G, and B components are then encoded using a table of 32 entries. In one or more embodiments, this table is used for mapping of the combinations of the quantized R, G, and B components into codes.

In one or more embodiments, the 24 combinations for which at least two of the quantized R, G, and B components are not equal to each other are encoded using the first 24 entries of the table. In one or more embodiments, as illustrated in FIG. 7, codes "0" to "23" are allocated to the 24 combinations of different R, G, and B components.

In one or more embodiments, the three combinations for which the quantized R, G, and B components are equal to one another are encoded using the last eight entries of the table. In one or more embodiments, unlike the first 24 entries, the last eight entries are dependent on the luminance value W of the pixel to be encoded. In one or more embodiments, the luminance value W is calculated as the sum of the R component divided by 4, the G component divided by 2, and the B components divided by 4. In one or more embodiments, the code corresponding to the pixel of interest is determined as being a value in a range from 24 to 31 generated by dividing this luminance value W by 32, rounding off fractions, and adding 24.

In one or more embodiments, a code is thus determined for each of the pixels associated with the input block. In one or more embodiments, the compressed block is generated as a collection of the codes obtained for the respective pixels.

Figure 8:
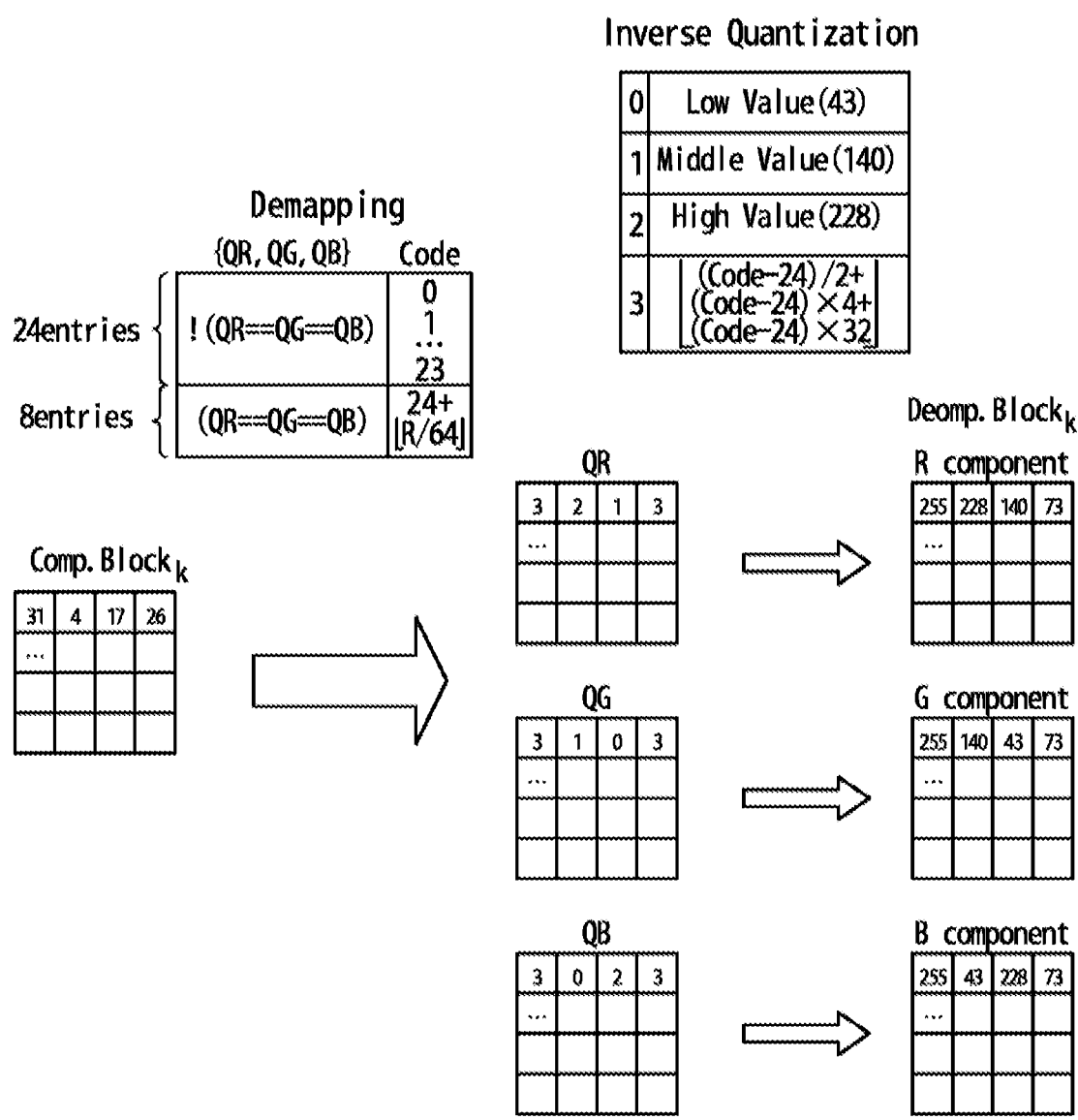
FIG. 8 illustrates decompression of a compressed block generated through Color 32 compression, according to one or more embodiments.

In one or more embodiments, as illustrated in FIG. 8, decompression of a compressed block generated by Color32 compression involves demapping the codes described in the compressed block into combinations of quantized R, G, and B components and performing inverse quantization to reconstruct the R, G, and B components. In one or more embodiments, the decompressed block comprises data describing the reconstructed R, G, and B components of the respective pixels.

In one or more embodiments, when the compression stage 31 in a first-stage compression submodule 22$_i$ is configured to perform Color32 compression, the decompression stage 32 in the first-stage compression submodule 22$_i$ is configured to accomplish decompression adapted to Color32 compression. In one or more embodiments, the header encoder 33 incorporates compression type information to specify Color32 compression.

Figure 9:
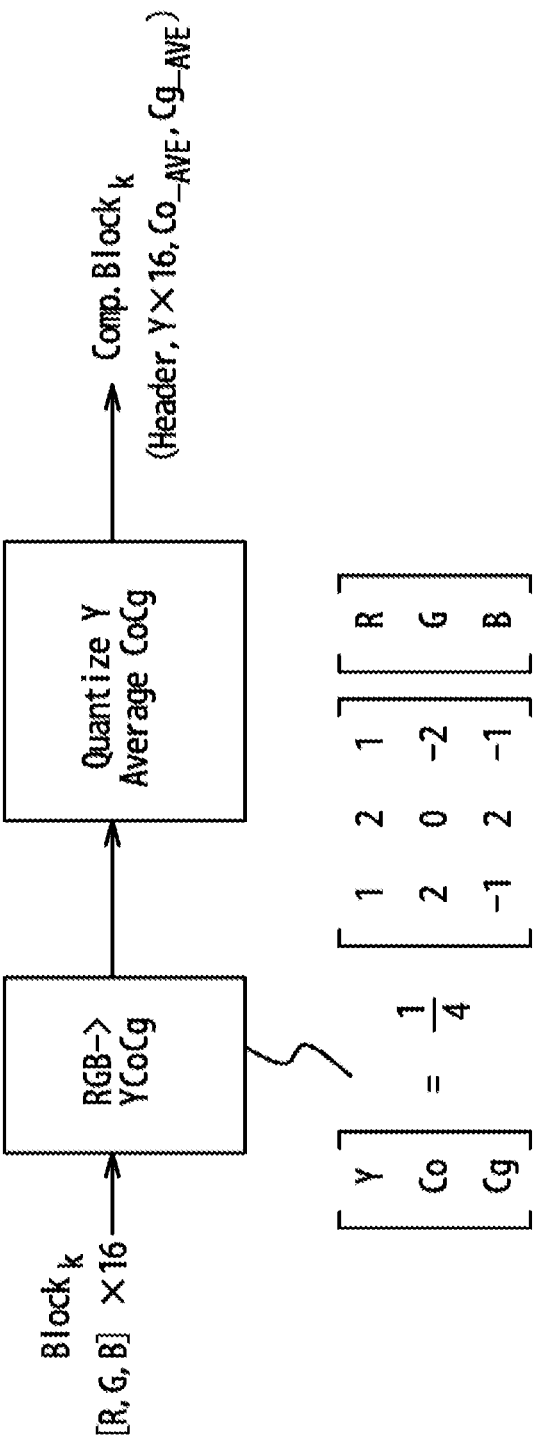
FIG. 9 illustrates YCoCg compression, according to one or more embodiments.

In one or more embodiments, YCoCg compression illustrated in FIG. 9 is used as one of stage-1 compression methods #1 to #N. Similarly to Color32 compression, YCoCg compression compresses each input block individually, not using information of other input blocks when generating a compressed block from the input block.

In one or more embodiments, YCoCg compression first performs RGB-YCoCg conversion on each of the pixel data associated with 4×4 pixels included in the input block to calculate a luminance value Y and chromaticity values Co and Cg. In one or more embodiments, the RGB-YCoCg conversion is achieved in accordance with the following equation (1):

$$\begin{bmatrix} Y \\ Co \\ Cg \end{bmatrix} = \frac{1}{4} \begin{bmatrix} 1 & 2 & 1 \\ 2 & 0 & -2 \\ -1 & 2 & -1 \end{bmatrix} \begin{bmatrix} R \\ G \\ B \end{bmatrix}. \quad (1)$$

In one or more embodiments, the luminance value Y of each pixel is calculated as an 8-bit data, and the chromaticity values Co and Cg are calculated as a 9-bit data. In one or more embodiments, this is followed by quantizing the luminance values Y of the respective 4×4 pixels by truncating the lower four bits and calculating the average value Co$_{\_AVE}$ of the chromaticity values Co of the 4×4 pixels and the average value Cg$_{\_AVE}$ of the chromaticity values Cg. In one or more embodiments, the compressed block comprises a header, 4×16 bits representing the quantized luminance values Y of the respective 16 pixels, 9 bits representing the average value Co$_{\_AVE}$, and 9 bits representing the average value Cg$_{\_AVE}$.

Figure 10:
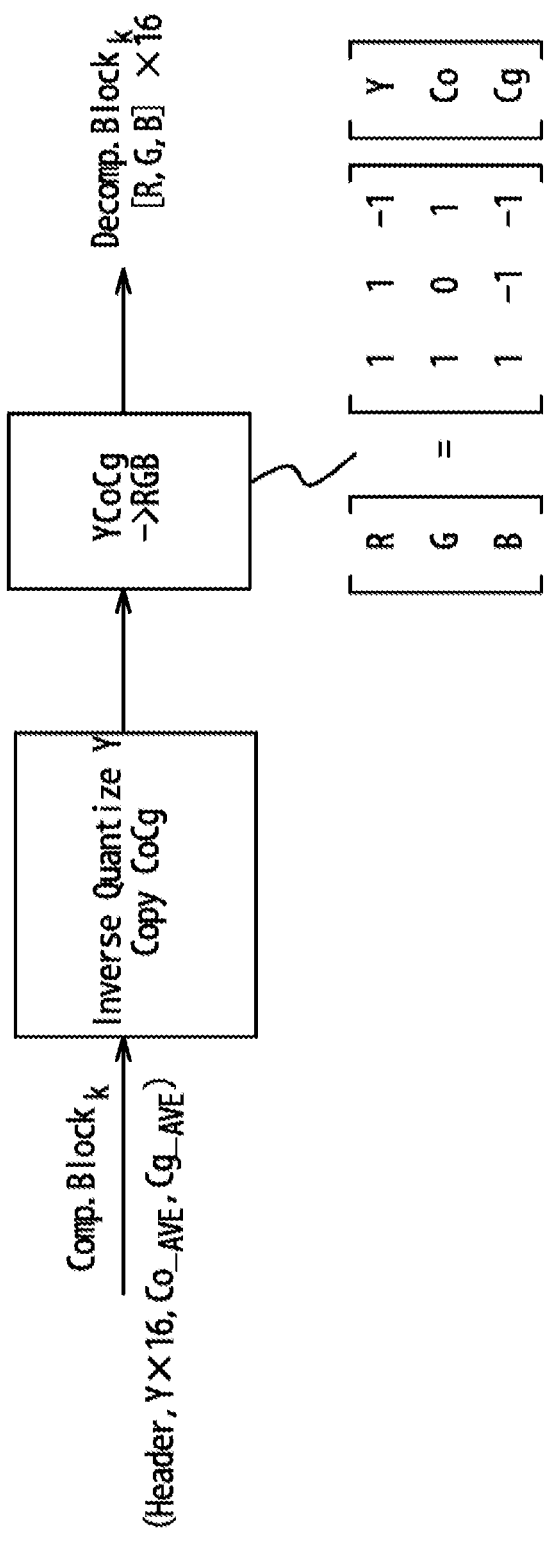
FIG. 10 illustrates decompression of a compressed block generated through the YCoCg compression, according to one or more embodiments.

In one or more embodiments, as illustrated in FIG. 10, decompression of a compressed block generated by YCoCg compression involves first reconstructing the luminance value Y of each pixel by concatenating the quantized 4-bit brightness value Y by itself. In one or more embodiments, the reconstructed luminance value Y can be represented as an 8-bit value {Y[3:0], Y[3:0]}, where Y[3:0] is the quantized 4-bit luminance value Y. This is followed by reconstructing the chromaticity values Co and Cg of each pixel by copying the average chromaticity values Co$_{\_AVE}$ and Cg$_{\_AVE}$.

In one or more embodiments, YCoCg-RGB conversion is performed on the reconstructed luminance value Y and chromaticity values Co and Cg of each pixel to reconstruct the R, G, and B components of each pixel. In one or more embodiments, the YCoCg-RGB conversion is performed in accordance with the following equation (2):

$$\begin{bmatrix} R \\ G \\ B \end{bmatrix} = \begin{bmatrix} 1 & 1 & -1 \\ 1 & 0 & 1 \\ 1 & -1 & -1 \end{bmatrix} \begin{bmatrix} Y \\ Co \\ Cg \end{bmatrix}. \quad (2)$$

In one or more embodiments, the decompressed block comprises data describing the R, G, and B components reconstructed in accordance with expression (2).

Referring back to FIG. 3, stage-1 compression methods #1 to #N may have different latencies, and their corresponding decompression methods may have different latencies. A complicated compression method and a decompression method tend to have longer latencies. In one or more embodiments, to absorb variations in the latency, delays are given to the input blocks supplied from the pipelined storage 21 to the respective first-stage compression submodules $22_1$ to $22_N$. The delays may be adjusted depending on the compression methods and/or the decompression methods. For example, the input block $Block_k$ is supplied to the respective first-stage compression submodules $22_1$ to $22_N$ at the times when T1 to TN unit times have respectively elapsed after the time t when the input block $Block_k$ is inputted to the pipelined storage 21. The delays T1 to TN given to the input block $Block_k$ when the input block $Block_k$ is inputted to the respective first-stage compression submodules $22_1$ to $22_N$ may be adjusted based on the latencies in the first-stage compression submodules $22_1$ to $22_N$. The adjustment of the delays achieves synchronization of the timing at which the compressed blocks and/or decompressed blocks generated by the first-stage compression submodules $22_1$ to $22_N$ are supplied to the first-stage selector circuitry 12.

In one or more embodiments, the compressed blocks and/or decompressed blocks thus generated are supplied to the first-stage selector circuitry 12 at the timing when $T_c$ unit times have elapsed after the time t. In FIG. 3, the compressed block generated through stage-1 compression method #i in the first-stage compression submodule $22_i$ is denoted by the symbol "S1 Comp. #i $Block_{k,t-Tc}$", and the decompressed block generated through decompressing the compressed block S1 Comp. #i $Block_{k,t-Tc}$ generated through stage-1 compression method #i is denoted by the symbol "S1 Decomp. #i $Block_{k,t-Tc}$."

In one or more embodiments, the pipelined storage 21 is configured to supply the input block $Block_k$ to the first-stage selector circuitry 12 with a delay at the time when $T_c$ unit times have elapsed after the time t. The input block supplied from the pipelined storage 21 to the first-stage selector circuitry 12 is denoted by the symbol "$Block_{k,t-Tc}$." This operation achieves synchronization of the input blocks outputted from the pipelined storage 21 with the compressed blocks and decompressed blocks outputted from the first-stage compression submodules $22_1$ to $22_N$.

Figure 11:
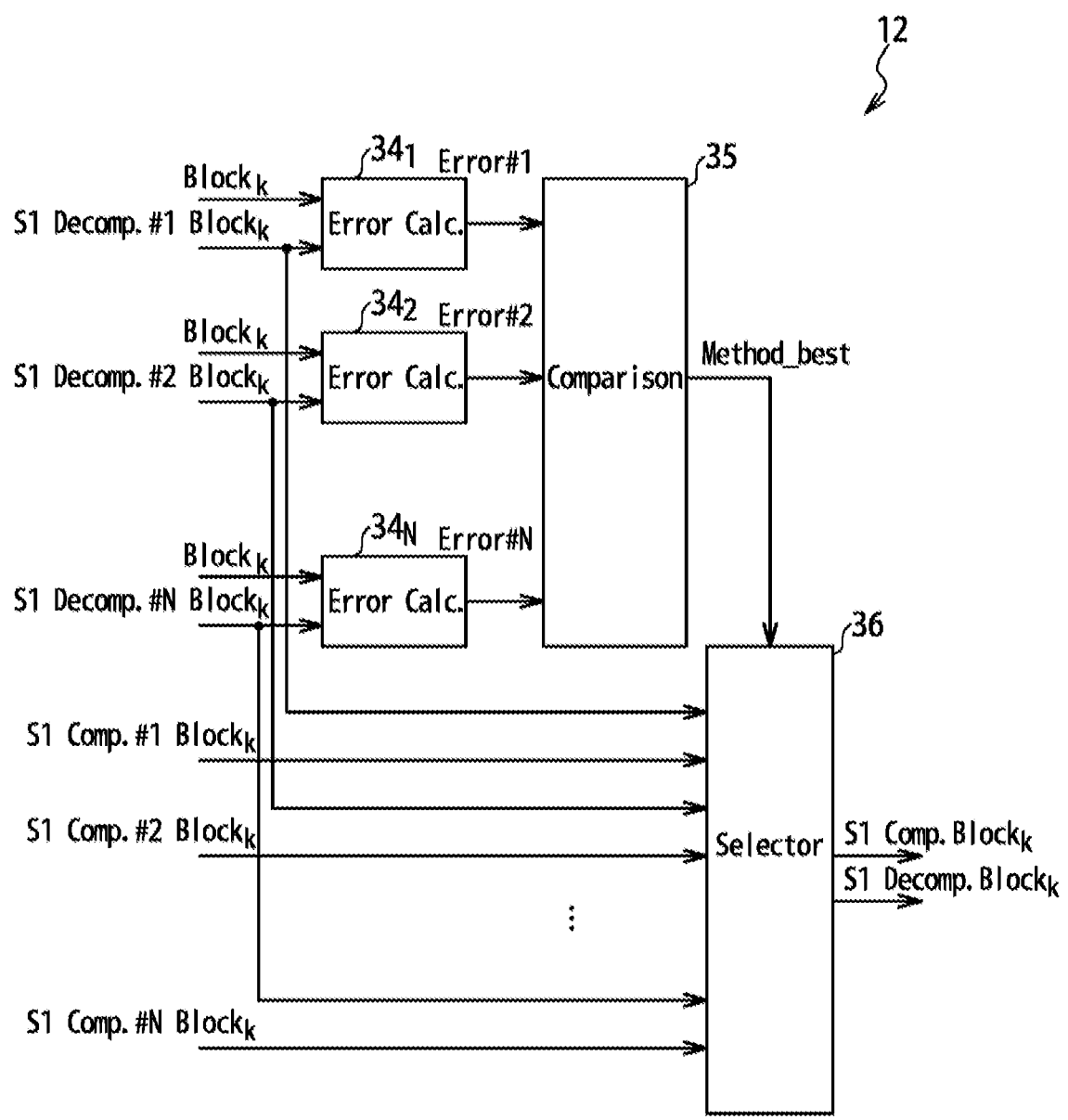
FIG. 11 illustrates one example configuration of a first-stage selector circuitry, according to one or more embodiments.

In one or more embodiments, the first-stage selector circuitry 12 is configured to select a "best compression method" from among stage-1 compression methods #1 to #N based on the comparison between the input block and the decompressed blocks respectively generated by the first-stage compression submodules $22_1$ to $22_N$. In one or more embodiments, the "best compression method" is the one which experiences the least compression distortion. In one or more embodiment, the best compression method is the one for which the similarity between the decompressed block and the original input block is the highest. In one or more embodiments, as illustrated in FIG. 11, the first-stage selector circuitry 12 comprises error calculation modules $34_1$ to $34_N$, a comparator 35, and a selector 36.

In one or more embodiments, each error calculation modules $34_i$ is configured to calculate an error Error #i between the input block $Block_k$ and the decompressed block S1 Decomp. #i $Block_k$ received from the first-stage compression submodule $22_i$ and output the calculated error Error #i to the comparator 35.

In one or more embodiments, the comparator 35 is configured to select the decompressed block with the highest similarity based on the errors Error #1 to #N calculated by the error calculation modules $34_1$ to $34_N$, respectively. In one or more embodiments, the comparator 35 is configured to select the decompressed block with the least error. In one or more embodiments, the comparator 35 is configured to select the compression method associated with the decompressed block with the highest similarity or with the least error, as the "best compression method," and generate a select signal Method_best indicative of the best compression method thus selected.

In one or more embodiments, the selector 36 is configured to receive the compressed blocks S1 Comp. #1 $Block_k$ to S1 Comp. #N $Block_k$ and the decompressed blocks S1 Decomp. #1 $Block_k$ to S1 Decomp. #N $Block_k$ from the first-stage compression submodules $22_1$ to $22_N$. In one or more embodiments, the selector 36 is configured to select the compressed block corresponding to the best compression method indicated by the select signal Method_best from among the compressed blocks S1 Comp. #1 $Block_k$ to S1 Comp. #N $Block_k$. In one or more embodiments, the selector 36 is further configured to select the decompressed block obtained through decompression of the selected compressed block from among the decompressed blocks S1 Decomp. #1 $Block_k$ to S1 Decomp. #N $Block_k$. The selected compressed block and decompressed block may be hereinafter referred to as first-stage-selected compressed block and first-stage-selected decompressed block, respectively.

Referring back to FIG. 3, in one or more embodiments, the first-stage-selected compressed block and first-stage-selected decompressed block selected by the first-stage selector circuitry 12 are forwarded to the second-stage compression circuitry 13. In FIG. 3, the first-stage-selected compressed block is denoted by the symbol "S1 Comp. $Block_{k,t-Ts1}$," and the first-stage-selected decompressed block is denoted by the symbol "S1 Decomp. $Block_{k,t-Ts1}$."

In one or more embodiments, the second-stage compression circuitry 13 comprises a pipelined storage 23 and M second-stage compression submodules $24_1$ to $24_M$. In alternative embodiments, the pipelined storage 23 may be disposed separately from the second-stage compression circuitry 13.

In one or more embodiments, the pipelined storage 23 is configured to distribute input blocks $Block_k$ sequentially supplied thereto to the second-stage compression submodules $24_1$ to $24_M$ with appropriate delays.

In one or more embodiments, the second-stage compression submodules $24_1$ to $24_M$ are configured to generate compressed blocks by compressing the input blocks $Block_k$ sequentially supplied thereto with different compression methods and further generate decompressed blocks by decompressing the compressed blocks. The compression method used by the second-stage compression submodule $24_i$ may be hereinafter referred to as "stage-2 compression method #i."

In one or more embodiments, unlike stage-1 compression methods #1 to #N, stage-2 compression methods #1 to #M are configured to, when compressing an input block $Block_k$, refer to at least one first-stage-selected decompressed block corresponding to a neighboring input block of the input block $Block_k$. In one or more embodiments, stage-2 compression methods #1 to #M are configured to refer to the first-stage-selected decompressed blocks obtained by compressing the input blocks $Block_{k-kp}$ to $Block_{k-1}$ inputted before the input block $Block_k$ through the "best compression methods" and decompressing the resultant compressed blocks through the corresponding decompression methods, and/or the first-stage-selected decompressed blocks obtained by compressing the input blocks $\text{Block}_{k+1}$ to $\text{Block}_{k+kf}$ inputted after the input block $\text{Block}_k$ through the "best compression methods" and decompressing the resultant compressed blocks through the corresponding decompression methods, where kp and kf are integers of one or more. In one or more embodiments, the "best compression method" is the one selected by the first-stage selector circuitry 12 for each input block. The reference to the first-stage-selected decompressed blocks associated with the input blocks $\text{Block}_{k-kp}$ to $\text{Block}_{k-1}$ and/or the input blocks $\text{Block}_{k+1}$ to $\text{Block}_{k+kf}$ effectively enables using correlation between adjacent decompressed blocks and thereby achieves a high compression ratio with suppressed compression distortion.

In one or more embodiments, the pipelined storage 23 is configured to distribute the first-stage-selected decompressed blocks S1 Decomp. $\text{Block}_{k,t-Ts1}$ sequentially inputted from the first-stage selector circuitry 12, to the second-stage compression submodules $24_1$ to $24_M$ with appropriate delays. In one or more embodiments, the pipelined storage 23 is configured to distribute based on the compression processes performed in the second-stage compression submodules $24_1$ to $24_M$, the first-stage selected decompressed blocks S1 Decomp. $\text{Block}_{k-kp}$ to S1 Decomp. $\text{Block}_{k-1}$ and/or S1 Decomp. $\text{Block}_{k+1}$ to S1 Decomp. $\text{Block}_{k+kf}$ used for the compression of the respective input blocks $\text{Block}_k$, to the second-stage compression submodules $24_1$ to $24_M$. In one or more embodiments, in the compression processing of each input block $\text{Block}_{k-1}$, the first-stage-selected decompressed block S1 Decomp. $\text{Block}_{k-1}$ generated from the input block $\text{Block}_{k-1}$ is supplied to the second-stage compression submodule $24_1$ and the first-stage-selected decompressed block S1 Decomp. $\text{Block}_{k+1}$ generated from the input block $\text{Block}_{k+1}$ is supplied to the second-stage compression submodule $24_2$, as illustrated in FIG. 3.

In one or more embodiments, the second-stage compression submodules $24_1$ to $24_M$ have a common structure illustrated in FIG. 12. In one or more embodiments, each second-stage compression submodules $24_i$ comprises a compression stage 37, a decompression stage 38, and a header encoder 39. In one or more embodiments, the compression stage 37 is configured to generate a compressed block ^Comp. $\text{Block}_k$ by compressing each input block $\text{Block}_k$. In one or more embodiments, the decompression stage 38 is configured to generate a decompressed block S2 Decomp. $\text{Block}_k$ by decompressing the compressed block ^Comp. $\text{Block}_k$ generated by the compression stage 37. In one or more embodiments, the header encoder 39 is configured to generate a compressed block S2 Comp. $\text{Block}_k$ to be finally outputted to the second-stage selector circuitry 14 by attaching a header to the compressed block ^Comp. $\text{Block}_k$.

In one or more embodiments, in synchronization with the input of each input block $\text{Block}_k$, the compression stages 37 of the second-stage compression submodules $24_1$ to $24_M$ are configured to receive the first-stage-selected decompressed blocks S1 Decomp. $\text{Block}_{k-kp}$ to S1 Decomp. $\text{Block}_{k-1}$ generated by compressing and decompressing the input blocks $\text{Block}_{k-kp}$ to $\text{Block}_{k-1}$ with the best compression methods and decompression methods and/or the first-stage-selected decompressed blocks S1 Decomp. $\text{Block}_{k+1}$ to S1 Decomp. $\text{Block}_{k+kf}$ generated by compressing and decompressing the input blocks $\text{Block}_{k+1}$ to $\text{Block}_{k+kf}$ with the best compression methods and decompression methods, where kp and kf are integers of one or more. In one or more embodiments, the "best compression method and decompression method" are the compression method selected by the first-stage selector circuitry 12 and the corresponding decompression method. In one or more embodiments, the compression stages 37 are configured to perform compression processes, referring to the first-stage-selected decompressed blocks supplied thereto.

Figure 13:
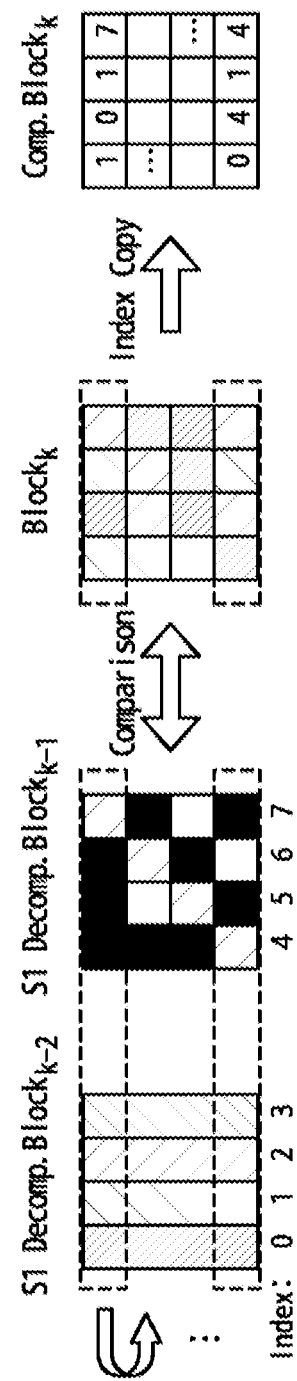
FIG. 13 illustrates LutNext compression, according to one or more embodiments.

In one or more embodiments, LutNext compression illustrated in FIG. 13 is used as one of stage-2 compression methods #1 to #M. In one or more embodiments, LutNext compression is configured to, when compressing the input block $\text{Block}_k$, refer to the first-stage-selected decompressed blocks S1 Decomp. $\text{Block}_{k-2}$ and S1 Decomp. $\text{Block}_{k-1}$ respectively generated from the input blocks $\text{Block}_{k-2}$ and $\text{Block}_{k-1}$, which are inputted to the second-stage compression circuitry 13 before the input block $\text{Block}_k$.

In one or more embodiments, LutNext compression is configured to compare the pixel data of each pixel of the input block $\text{Block}_k$ with the pixel data of each pixel of the first-stage-selected decompressed blocks S1 Decomp. $\text{Block}_{k-2}$ and S1 Decomp. $\text{Block}_{k-1}$. In one or more embodiments, for each pixel of the input block $\text{Block}_k$, an index indicating the pixel with the highest similarity among the pixels of the first-stage-selected decompressed blocks S1 Decomp. $\text{Block}_{k-2}$ and S1 Decomp. $\text{Block}_{k-1}$ is encoded into the second-stage compressed block. In one or more embodiments, the pixel with the highest similarity is the pixel with the least error.

In one or more embodiments, it is not necessary to compare the pixel data of each pixel of the input block $\text{Block}_k$ with the pixel data of all the pixels of the first-stage decompressed blocks S1 Decomp. $\text{Block}_{k-2}$ and S1 Decomp. $\text{Block}_{k-1}$. In one or more embodiments, the pixel data of each pixel of the input block $\text{Block}_k$ may be compared with pixel data of pixels positioned in the same horizontal line of the first-stage decompressed blocks S1 Decomp. $\text{Block}_{k-2}$ and S1 Decomp. $\text{Block}_{k-1}$. In this case, a 3-bit index from zero to 7 is encoded into the compressed block ^Comp. $\text{Block}_k$ for each pixel of the input block $\text{Block}_k$, since pixel data of eight pixels of the first-stage-selected decompressed blocks S1 Decomp. $\text{Block}_{k-2}$ and S1 Decomp. $\text{Block}_{k-1}$ are compared with the pixel data of each pixel of the input block $\text{Block}_k$.

In one or more embodiments, as illustrated in FIG. 13, the second pixel from the left on the uppermost line of the first-stage-selected decompressed block S1 Decomp. $\text{Block}_{k-2}$ exhibits the highest similarity to the pixel data of the leftmost top pixel of the 4×4 pixels of the input block $\text{Block}_k$. In this case, the compressed data associated with the leftmost top pixel of the decompressed block is determine as "1" in one or more embodiments, since an index of "1" is allocated to the second pixel from the left on the uppermost line of the first-stage-selected decompressed block S1 Decomp. $\text{Block}_{k-2}$.

In one or more embodiments, three or more first-stage-selected decompressed blocks S1 Decomp. $\text{Block}_{k-kp'}$ to S1 Decomp. $\text{Block}_{k-1}$, which are respectively generated from three or more preceding input blocks $\text{Block}_{k-kp'}$ to $\text{Block}_{k-1}$, may be referred to in compressing the input block $\text{Block}_k$, where kp' is an integer of three or more.

Figure 14:
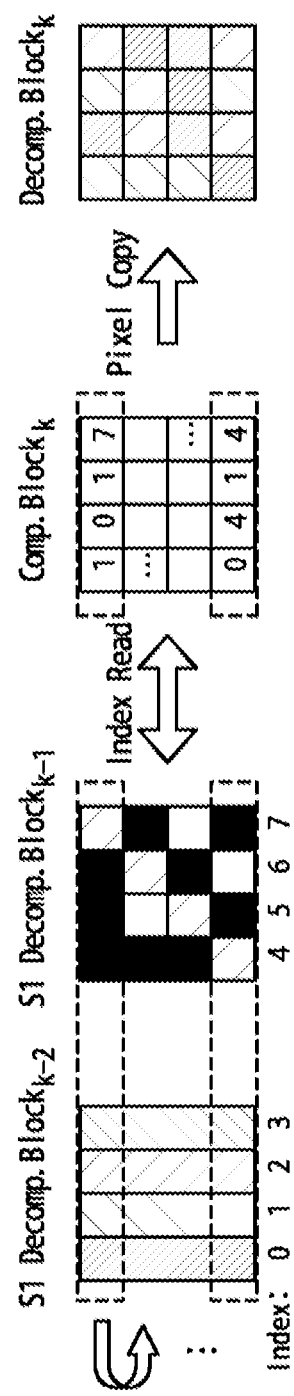
FIG. 14 illustrates decompression of a compressed block generated through LutNext compression.

In one or more embodiments, as illustrated in FIG. 14, decompression of a compressed block generated through LutNext compression is the reverse of the compression procedure. In one or more embodiments, the indexes described in the compressed block each specify the pixel with the highest similarity among the pixels of the first-stage-selected decompressed blocks S1 Decomp. $\text{Block}_{k-2}$ and S1 Decomp. $\text{Block}_{k-1}$, and the pixel data of the pixels specified by the indexes are used as the pixel data of the respective pixels of the decompressed block Decomp. Block$_k$.

In one or more embodiments, the compression data for the leftmost top pixel of the 4×4 pixels of the compressed block Comp. Block$_k$ comprises an index of "1." In one or more embodiments, the index of "1" specifies the second pixel from the left of the topmost line of the first-stage-selected decompressed block S1 Decomp. Block$_{k-2}$ and therefore the pixel data of the specified pixel is used as the pixel data of the leftmost top pixel of the decompressed block Decomp. Block$_k$.

In one or more embodiments, when the compressed stage 37 in a second-stage compression submodule 24$_i$ is configured to perform LutNext compression, the decompression stage 38 in this second-stage compression submodule 24$_i$ is configured to perform the decompression process adapted to LutNext compression. In one or more embodiments, the header encoder 39 incorporates compression type information to specify LutNext compression in the header.

Figure 15:
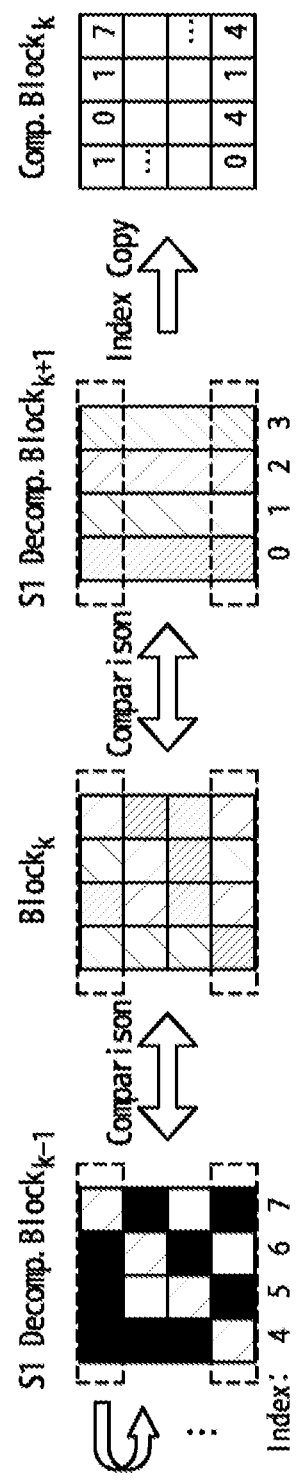
FIG. 15 illustrates LutPre compression, according to one or more embodiments.

In one or more embodiments, LutPre compression illustrated in FIG. 15 is used as one of stage-2 compression method #1 to #M. In one or more embodiments, LutPre compression is configured to, when compressing the input block Block$_k$, refer to the first-stage-selected decompressed block S1 Decomp. Block$_{k-1}$ generated from the input block Block$_{k-1}$ and the first-stage-selected decompressed block S1 Decomp. Block$_{k+1}$ generated from the input block Block$_{k+1}$, where the input block Block$_{k-1}$ is inputted to the second-stage compression circuitry 13 before the input block Block$_k$ and the input block Block$_{k+1}$ is inputted to the second-stage compression circuitry 13 after the input block Block$_k$.

In one or more embodiments, LutPre compression is configured to compare the pixel data of each pixel of the input block Block$_k$ with the pixel data of each pixel of the first-stage-selected decompressed blocks S1 Decomp. Block$_{k-1}$ and S1 Decomp. In one or more embodiments, for each pixel of the input block Block$_k$, an index indicating the pixel with the highest similarity among the pixels of the first-stage-selected decompressed blocks S1 Decomp. Block$_{k-1}$ and S1 Decomp. Block$_{k+1}$ is encoded into the second-stage compressed block ^Comp. Block$_k$. In one or more embodiments, the pixel with the highest similarity is the pixel with the least error.

In various embodiments, it is not necessary to compare the pixel data of each pixel of the input block Block$_k$ with the pixel data of all the pixels of the first-stage decompressed blocks S1 Decomp. Block$_{k-1}$ and S1 Decomp. Block$_{k+1}$. In one or more embodiments, the pixel data of each pixel of the input block Block$_k$ may be compared with pixel data of pixels positioned in the same horizontal line of the first-stage decompressed blocks S1 Decomp. Block$_{k-1}$ and S1 Decomp. Block$_{k+1}$. In such embodiments, a 3-bit index from zero to 7 is encoded into the compressed block ^Comp. Block$_k$ for each pixel of the input block Block$_k$, since pixel data of eight pixels of the first-stage-selected decompressed blocks S1 Decomp. Block$_{k-1}$ and S1 Decomp. Block$_{k+1}$ are compared with the pixel data of each pixel of the input block Block$_k$.

In one or more embodiments, as illustrated in FIG. 15, the second pixel from the left on the uppermost line of the first-stage-selected decompressed block S1 Decomp. Block$_{k+1}$ exhibits the highest similarity to the pixel data of the leftmost top pixel of the 4×4 pixels of the input block Block$_k$. In such an embodiment, the compressed data associated with the leftmost top pixel of the compressed block is determine as "1" in one or more embodiments, since an index of "1" is allocated to the second pixel from the left on the uppermost line of the first-stage-selected decompressed block S1 Decomp. Block$_{k+1}$.

In one or more embodiments, the first-stage-selected decompressed blocks S1 Decomp. Block$_{k-kp}$ to S1 Decomp. Block$_{k-1}$, which are respectively generated from two or more input blocks Block$_{k-kp}$ to Block$_{k-1}$ inputted before the input block Block$_k$, may be referred to in compressing the input block Block$_k$, where kp is an integer of two or more. In one or more embodiments, the first-stage-selected decompressed blocks S1 Decomp. Block$_{k+1}$ to S1 Decomp. Block$_{k+kp}$, which are respectively generated from two or more input blocks Block$_{k+1}$ to Block$_{k+kp}$ inputted after the input block Block$_k$, may be referred to in compressing the input block Block$_k$.

Figure 16:
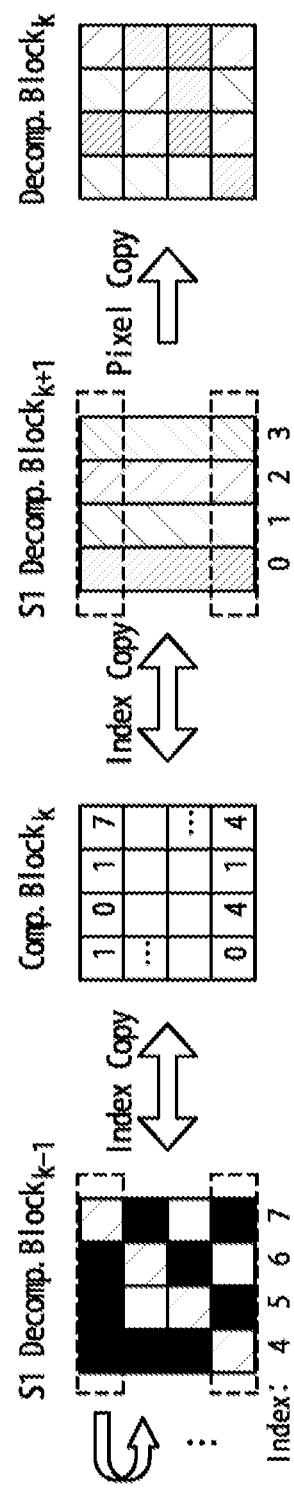
FIG. 16 illustrates decompression of a compressed block generated through LutPre compression.

In one or more embodiments, as illustrated in FIG. 16, decompression of a compressed block generated through LutPre compression is the reverse of the compression procedure. In one or more embodiments, the indexes described in the compressed block each specify the pixel with the highest similarity among the pixels of the first-stage-selected decompressed blocks S1 Decomp. Block$_{k-1}$ and S1 Decomp. Block$_{k+1}$, and the pixel data of the pixels specified by the indexes are used as the pixel data of the respective pixels of the decompressed block Decomp. Block$_k$.

In one or more embodiments, the compression data for the leftmost top pixel of the 4×4 pixels of the compressed block Comp. Block$_k$ comprises an index of "1." In one or more embodiments, the index of "1" specifies the second pixel from the left of the topmost line of the first-stage-selected decompressed block S1 Decomp. Block$_{k+1}$, and therefore the pixel data of the specified pixel is used as the pixel data of the leftmost top pixel of the decompressed block Decomp. Block$_k$.

In one or more embodiments, when the compressed stage 37 in a second-stage compression submodule 24$_i$ is configured to perform LutPre compression, the decompression stage 38 in this second-stage compression submodule 24$_i$ is configured to perform the decompression process adapted to LutPre compression. In one or more embodiments, the header encoder 39 incorporates compression type information to specify LutPre compression in the header.

In one or more embodiments, the second-stage compression submodules 24$_1$ to 24$_M$ may comprise a compression submodule designed to compress respective input blocks individually to generate compressed blocks. In one or more embodiments, at least one of the second-stage compression submodules 24$_1$ to 24$_M$ is configured to, when compressing an input block Block$_k$, refer to one or more first-stage-selected decompressed blocks corresponding to input blocks neighboring to the input block Block$_k$.

Referring back to FIG. 3, as is the case with stage-1 compression methods #1 to #N and their corresponding decompression methods, stage-2 compression methods #1 to #M may have different latencies, and their corresponding decompression methods may have different latencies. In one or more embodiments, to absorb variations in the latency, delays are given to the input blocks supplied from the pipelined storage 23 to the respective second-stage compression submodules 24$_1$ to 24$_M$. In one or more embodiments, the delays are adjusted based on the compression methods and/or the decompression methods. In one or more embodiments, the input block Block$_k$ is supplied to the respective second-stage compression submodules 24$_1$ to 24$_M$ at the times when T1' to TM' unit times have respectively elapsed after the time t. The delays T1' to TM' given to the input block Block$_k$ when the input block Block$_k$ is inputted to the respective second-stage compression submodules $24_1$ to $24_M$ are adjusted based on the latencies of the second-stage compression submodules $24_1$ to $24_M$.

In one or more embodiments, the pipelined storage 23 is configured to supply first-stage-selected decompressed data used for compression of each input block $Block_k$ to the second-stage compression submodules $24_1$ to $24_M$, in synchronization with the supply of each input block $Block_k$ to the second-stage compression submodules $24_1$ to $24_M$. In one or more embodiments, the pipelined storage 23 is configured to supply to the second-stage compression submodules $24_1$ to $24_M$ the first-stage-selected decompressed data used for compression processes performed therein, at the times when T1' to TM' unit times have elapsed after the time t, respectively.

In one or more embodiments, the compressed blocks and/or decompressed blocks generated by the second-stage compression submodules $24_1$ to $24_M$ are thereby supplied to the second-stage selector circuitry 14 at the time when Tc' unit times have elapsed after the time t. In FIG. 3, a compressed block generated through stage-2 compression method #i in the second-stage compression submodule $24_i$ is denoted by the symbol "S2 Comp. #i $Block_{k,t-Tc'}$", and a decompressed block generated through decompressing the compressed block S2 Comp. #i $Block_{k,t-Tc'}$ generated through stage-2 compression method #i is denoted by the symbol "S2 Decomp. #i $Block_{k,t-Tc'}$."

In one or more embodiments, the pipelined storage 23 is further configured to supply the input block $Block_k$, the first-stage-selected compressed block S1 Comp. $Block_k$ and the first-stage-selected decompressed block S1 Decomp. $Block_k$ to the second-stage selector circuitry 14 with a delay at the time when Tc' unit times have elapsed after the time t. The input block supplied from the pipelined storage 23 to the second-stage selector circuitry 14 is denoted by the symbol "$Block_{k,t-Tc'}$" in FIG. 3. The first-stage-selected compressed block and the first-stage-selected decompressed block supplied from the pipelined storage 23 to the second-stage selector circuitry 14 are denoted by the symbols "S1 Comp. $Block_{k,t-Tc'}$" and "S1 Decomp. $Block_{k,t-Tc'}$", respectively.

In one or more embodiments, the above-described operation achieves synchronization of the supply of the input block, the first-stage-selected compressed block, and the first-stage-selected decompressed block from the pipelined storage 23 to the second-stage selector circuitry 14 and the supply of the compressed blocks and the decompressed blocks from the second-stage compression submodules $24_1$ to $24_M$ to the second-stage selector circuitry 14.

In one or more embodiments, the second-stage selector circuitry 14 is configured to select a "best compression method" from among the first-stage-selected compression method and stage-2 compression methods #1 to #M based on comparison between the input block and the first-stage-selected decompressed block and comparison between the input block and the decompressed blocks generated by the second-stage compression submodules $24_1$ to $24_M$. In one or more embodiments, the "best compression method" is the one which experiences the least compression distortion. In one or more embodiment, the best compression method is the one for which the similarity between the decompressed block and the original input block is the highest. In one or more embodiments, the second-stage selector circuitry 14 is configured to output the compressed block generated by the "best compression method" thus selected. In one or more embodiments, the compressed image data finally outputted from the image compression circuitry 1 comprise compressed blocks outputted from the second-stage selector circuitry 14.

In one or more embodiments, the image compression circuitry 1 illustrated in FIG. 3 achieves appropriate compression processing based on an image feature. In one or more embodiments, the image compression circuitry 1 is configured to select a best compression method from among stage-1 compression methods #1 to #n and stage-2 compression methods #1 to #M for each input block. Such configuration allows performing suitable compression processing when an image contains various types of features.

In one or more embodiments, a design in which at least one of the second-stage compression submodules $24_1$ to $24_M$ is configured to refer, in compressing an input block $Block_k$, to a first-stage-selected decompressed block corresponding to an input block neighboring to the input block $Block_k$ is useful for a case where the image to be compressed comprises regions having a common feature. In one or more embodiments, the common feature may comprise a color, a shape, a curve, and a pattern.

Figure 17:
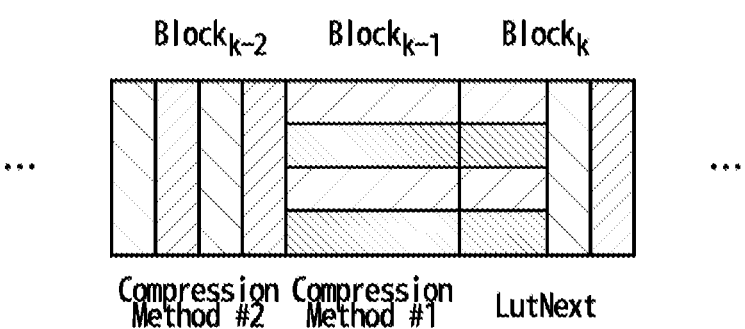
FIG. 17 illustrates LutNext compression, according to one or more embodiments.
Figure 18:
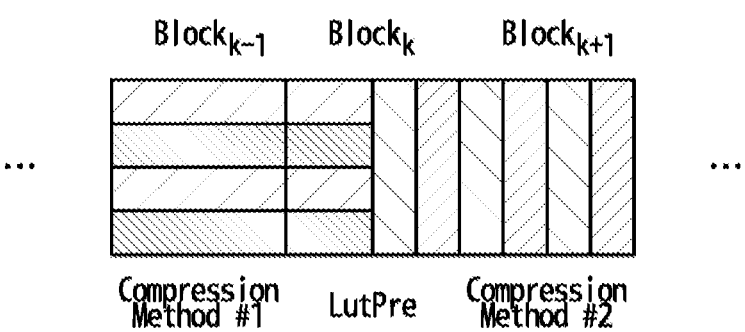
FIG. 18 illustrates LutPre compression, according to one or more embodiments.

The above-described LutNext compression and LutPre compression are useful especially when individual blocks comprise different features which are suitable for being compressed with different compression methods. In one or more embodiments, as illustrated in FIG. 17, use of LutNext compression effectively reduces compression distortion when the input block $Block_k$ contains a feature of the input block $Block_{k-1}$ which is inputted to the image compression circuitry 1 before the input block $Block_k$ and a feature of the input block $Block_{k-2}$ which is inputted to the image compression circuitry 1 before the input block $Block_{k-1}$. In one or more embodiments, as illustrated in FIG. 18, use of LutPre compression effectively reduces compression distortion when the input block $Block_k$ contains a feature of the input block $Block_{k-1}$ which is inputted to the image compression circuitry 1 before the input block $Block_k$ and a feature of the input block $Block_{k+1}$ which is inputted to the image compression circuitry 1 after the input block $Block_k$. In one or more embodiments, LutPre compression effectively reduces compression distortion in compression processing of an input block which incorporates a boundary between adjacent regions having different features. In one or more embodiments, LutPre compression causes an especially large reduction in compression distortion, since an input block often incorporates a boundary between adjacent regions having different features.

Figure 19:
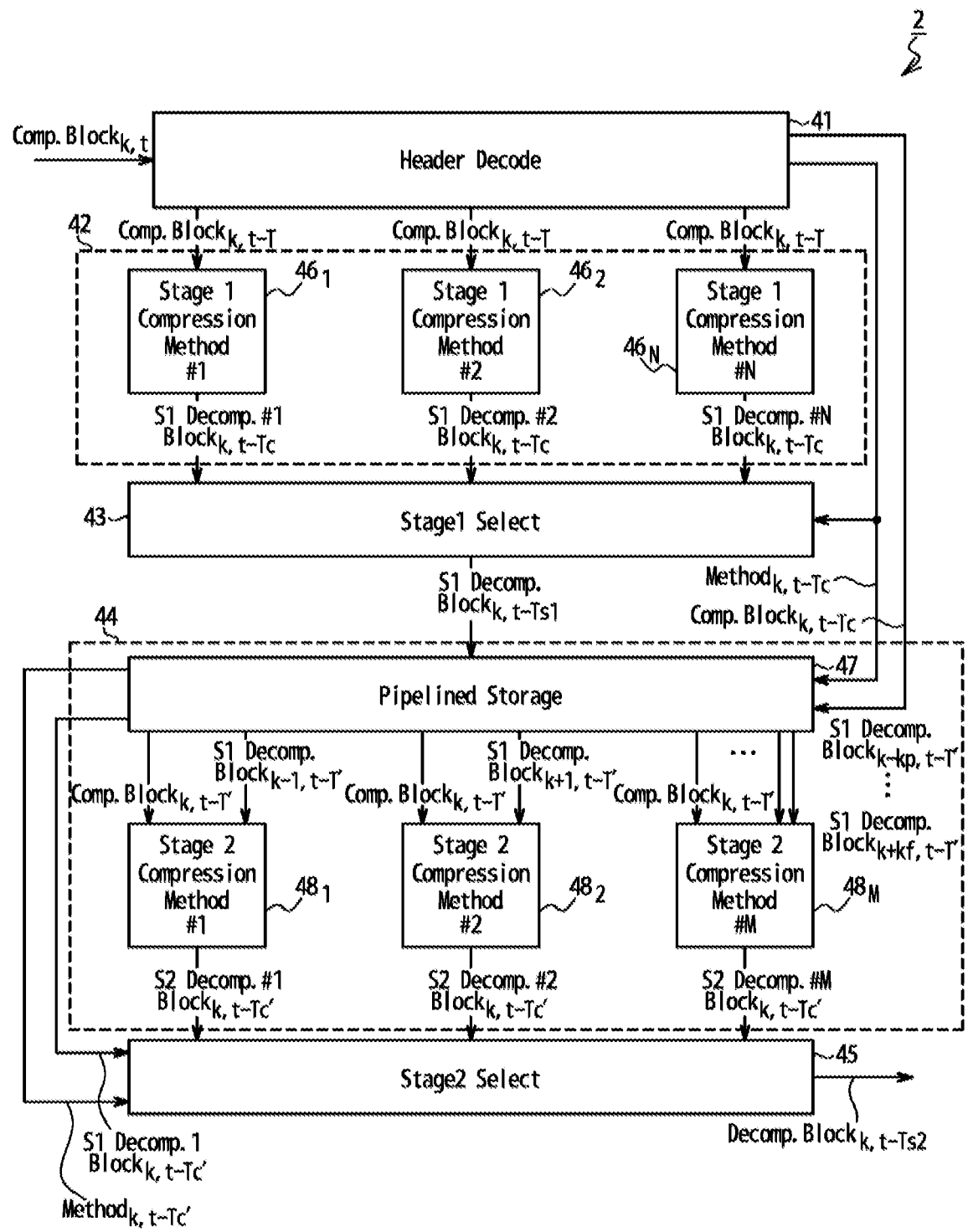
FIG. 19 illustrates one example configuration of image decompression circuitry, according to one or more embodiments.

In one or more embodiments, as illustrated in FIG. 19, the image decompression circuitry 2 is configured to generate a decompressed image data by decompressing the compressed image data generated by the image compression circuitry 1 as described above. In one or more embodiments, the compressed image data is divided into compressed blocks, and the compressed blocks are sequentially inputted to the image decompression circuitry 2. In FIG. 19, the compressed block which is $k^{th}$ inputted to the image decompression circuitry 2 is denoted by the symbol "Comp. $Block_{k,t}$."

In one or more embodiments, the image decompression circuitry 2 comprises a header decoder 41, a first-stage decompression circuitry 42, a first-stage selector circuitry 43, a second-stage decompression circuitry 44 and a second-stage selector circuitry 45. In one or more embodiments, the first-stage decompression circuitry 42 comprises first-stage decompression submodules $46_1$ to $46_N$. In one or more embodiments, the second-stage decompression circuitry 44 comprises a pipelined storage 47 and second-stage decompression submodules $48_1$ to $48_M$.

In one or more embodiments, the header decoder 41 is configured to decode the header incorporated in a compressed block to identify the compressed method used for generating the compressed block. In one or more embodiments, the identification of the compression method is based on the compression type information incorporated in the header of the compressed block. In one or more embodiments, the header decoder 41 is configured to notify the first-stage selector circuitry 43 and the second-stage selector circuitry 45 of the identified compression method. In FIG. 19, the compression method used for the generation of the compressed block Comp. Block$_{k,t}$ is indicated by the symbol "Method$_{k,t-Tc}$." In one or more embodiments, the header decoder 41 is configured to operate also as a pipelined storage supplying compressed blocks to the first-stage decompression submodules 46$_1$ to 46$_N$ of the first-stage decompression circuitry 42 with appropriate delays.

In one or more embodiments, the first-stage decompression submodules 46$_1$ to 46$_N$ are configured to generate first-stage decompressed blocks by decompressing the compressed block Comp. Block$_{k,t-T}$ with stage-1 decompression methods #1 to #N corresponding to stage-1 compression methods #1 to #N, respectively. The first-stage decompressed blocks obtained by decompressing the compressed block Comp. Block$_{k,t-T}$ with stage-1 decompression methods #1 to #N are denoted by the symbols "S1 Decomp. #1 Block$_{k,t-T}$" to "S1 Decomp. #N Block$_{k,t-Tc}$", respectively.

Stage-1 decompression methods #1 to #N may have different latencies. A complicated decompression method tends to have a longer latency. In one or more embodiments, to absorb variations in the latency, delays are given to the compressed block Comp. Block$_{k,t-T}$ when the compressed block Comp. Block$_{k,t-T}$ is supplied from the header decoder 41 to the respective first-stage decompression submodules 46$_1$ to 46$_N$. In one or more embodiments, the delays are adjusted based on the decompression methods. The adjustment of the delays may achieve synchronization of the timing at which the first-stage decompression submodules 46$_1$ to 46$_N$ respectively supply the first-stage decompressed blocks S1 Decomp. #1 Block$_{k,t-Tc}$ to S1 Decomp. #N Block$_{k,t-Tc}$ generated thereby to the first-stage selector circuitry 43.

In one or more embodiments, the first-stage selector circuitry 43 is configured to select the first-stage decompressed blocks S1 Decomp. #1 Block$_{k,t-Tc}$ to S1 Decomp. #N Block$_{k,t-Tc}$ based on the compression method Method$_{k,t-Tc}$ notified from the header decoder 41. In one or more embodiments, the first-stage selector circuitry 43 is configured to, when the compression method Method$_{k,t-Tc}$ notified from the header decoder 41 is any one of stage-1 compression methods #1 to N#, select the first-stage decompressed block corresponding to the compression method Method$_{k,t-Tc}$. The first-stage decompressed block thus selected may be hereinafter referred to as first-stage-selected decompressed block, which is denoted by the symbol "S1 Decomp. Block$_{k,t-Ts1}$", in FIG. 19. In one or more embodiments, the first-stage-selected decompressed block S1 Decomp. Block$_{k,t-Ts1}$ is supplied to the pipelined storage 47 of the second-stage decompression circuitry 44.

When the compression method Method$_{k,t-Tc}$ is not any of stage-1 compression methods #1 to #N, that is, when the compression method Method$_{k,t-Tc}$ is any one of stage-2 compression methods #1 to #M, in one or more embodiments, all of the first-stage decompressed blocks S1 Decomp. #1 Block$_{k,t-Tc}$ to S1 Decomp. #N Block$_{k,t-Tc}$ are invalid data. In this case, any one of the first-stage decompressed blocks or a predetermined invalid data may be supplied to the pipelined storage 47 as the first-stage-selected decompressed block S1 Decomp. Block$_{k,t-Ts1}$.

In one or more embodiments, the second-stage decompression circuitry 44 comprises a pipelined storage 47, second-stage decompression submodules 48$_1$ to 48$_M$.

In one or more embodiments, the pipelined storage 47 is configured to distribute the compressed blocks sequentially inputted thereto to the second-stage decompression submodules 48$_1$ to 48$_M$. The compressed block distributed to the second-stage decompression submodules 48$_1$ to 48$_M$ is denoted by the symbol "Comp. Block$_{k-T}$." In one or more embodiments, the pipelined storage 47 is further configured to supply the first-stage-selected decompressed block S1 Decomp. Block$_k$ to the second-stage selector circuitry 45. In one or more embodiments, the pipelined storage 47 is further configured to notify the second-stage selector circuitry 45 of the compression method used to generate the compressed block Comp. Block$_{k,t}$ based on the notification from the header decoder 41.

In one or more embodiments, the second-stage decompression submodules 48$_1$ to 48$_M$ are configured to generate second-stage decompressed blocks by decompressing the compressed block Comp. Block$_{k,t-T'}$ through stage-2 decompression methods #1 to #M, which correspond to stage-2 compression methods #1 to #M, respectively. The second-stage decompressed blocks obtained by decompressing the compressed block Comp. Block$_{k,t-T'}$ through stage-2 decompression methods #1 to #M are denoted by the symbols "S2 Decomp. #1 Block$_{k,t-Tc}$" to "S2 Decomp. #M Block$_{k,t-Tc}$", respectively.

In one or more embodiments, stage-2 compression methods #1 to #M are designed to, when compressing each input block Block$_k$, refer to the first-stage-selected decompressed blocks obtained by compressing and decompressing input blocks neighboring to the input block Block$_k$, and accordingly stage-2 decompression methods #1 to #M are configured to, when decompressing each compressed block Comp. Block$_k$, refer to the first-stage-selected decompressed blocks obtained by decompressing compressed blocks neighboring to the compressed block Comp. Block$_k$.

In one or more embodiments, to achieve decompression processing with reference to the first-stage-selected decompressed blocks, the pipelined storage 47 is configured to distribute to the second-stage decompression submodules 48$_1$ to 48$_M$ the first-stage-selected decompressed blocks sequentially received from the first-stage selector circuitry 43. In one or more embodiments, the pipelined storage 47 is configured to distribute the first-stage-selected decompressed blocks S1 Decomp. Block$_{k-kp}$ to S1 Decomp. Block$_{k-1}$ and/or S1 Decomp. Block$_{k+1}$ to S1 Decomp. Block$_{k+kf}$ selected by the first-stage selector circuitry 43 to the second-stage decompression submodules 48$_1$ to 48$_M$ based on the decompression processes performed in the second-stage decompression submodules 48$_1$ to 48$_M$ to decompress the compressed block Comp. Block$_k$. In one or more embodiments, in decompressing the compressed block Comp. Block$_k$, the first-stage-selected decompressed block S1 Decomp. Block$_{k-1}$, which is generated from the compressed block Comp. Block$_{k-1}$, is supplied to the second-stage decompression submodule 48$_1$ and the first-stage-selected decompressed block S1 Decomp. Block$_{k+1}$, which is generated from the compressed block Comp. Block$_{k+1}$, is supplied to the second-stage decompression submodule 48$_2$ as illustrated in FIG. 19.

In one or more embodiments, when a second-stage decompression submodule 48$_i$ is configured to perform decompression adapted to the above-described LutNext compression, the first-stage-selected decompressed blocks S1 Decomp. Block$_{k-1}$ and S1 Decomp. Block$_{k-2}$ are supplied to the second-stage decompression submodule $48_i$, to decompress the compressed block Comp. Block$_k$. The first-stage-selected decompressed block S1 Decomp. Block$_{k-1}$ is obtained by decompressing the compressed block Comp. Block$_{k-1}$, which is inputted to the image decompression circuitry 2 just before the compressed block Comp. Block$_k$, and the first-stage-selected decompressed block S1 Decomp. Block$_{k-2}$ is obtained by decompressing the compressed block Comp. Block$_{k-2}$, which is inputted to the image decompression circuitry 2 just before the compressed block Comp. Block$_{k-1}$. The term "just before" may mean "immediately before" and/or "without any intervening compressed blocks being obtained."

In one or more embodiments, when a second-stage decompression submodule $48_{i'}$ is configured to perform decompression adapted to the above-described LutPre compression, the first-stage-selected decompressed blocks S1 Decomp. Block$_{k-1}$ and S1 Decomp. Block$_{k+1}$ are supplied to the second-stage decompression submodule $48_{i'}$, to decompress the compressed block Comp. Block$_k$, where the first-stage-selected decompressed block S1 Decomp. Block$_{k+1}$ is obtained by decompressing the compressed block Comp. Block$_{k+1}$, which is inputted to the image decompression circuitry 2 just after the compressed block Comp. Block$_k$. The term "just after" may mean "immediately after" and/or "without any intervening compressed blocks being obtained."

Stage-2 decompression methods #1 to #M may have different latencies. In one or more embodiments, to absorb variations in the latency, delays are given to the compressed blocks and the first-stage-selected decompressed blocks supplied from the pipelined storage 47 to the first-stage decompression submodules $48_1$ to $48_M$, respectively. In one or more embodiments, the delays are adjusted based on the decompression methods. The adjustment of the delay may achieve synchronization of the timing at which the second-stage decompression submodules $48_1$ to $48_M$ respectively supply the second-stage decompressed blocks generated thereby to the second-stage selector circuitry 45.

In one or more embodiments, the second-stage selector circuitry 45 is configured to select the decompressed block specified by the compression method Method$_{k,t-Tc}$ from among the first-stage selected decompressed block received from the pipelined storage 47 and the second-stage decompressed blocks respectively received from the second-stage decompression submodules $48_1$ to $48_M$ and output the selected decompressed block. In one or more embodiments, the decompressed image data outputted from the image decompression circuitry 2 comprises the decompressed blocks outputted from the second-stage selector circuitry 45.

Figure 20:
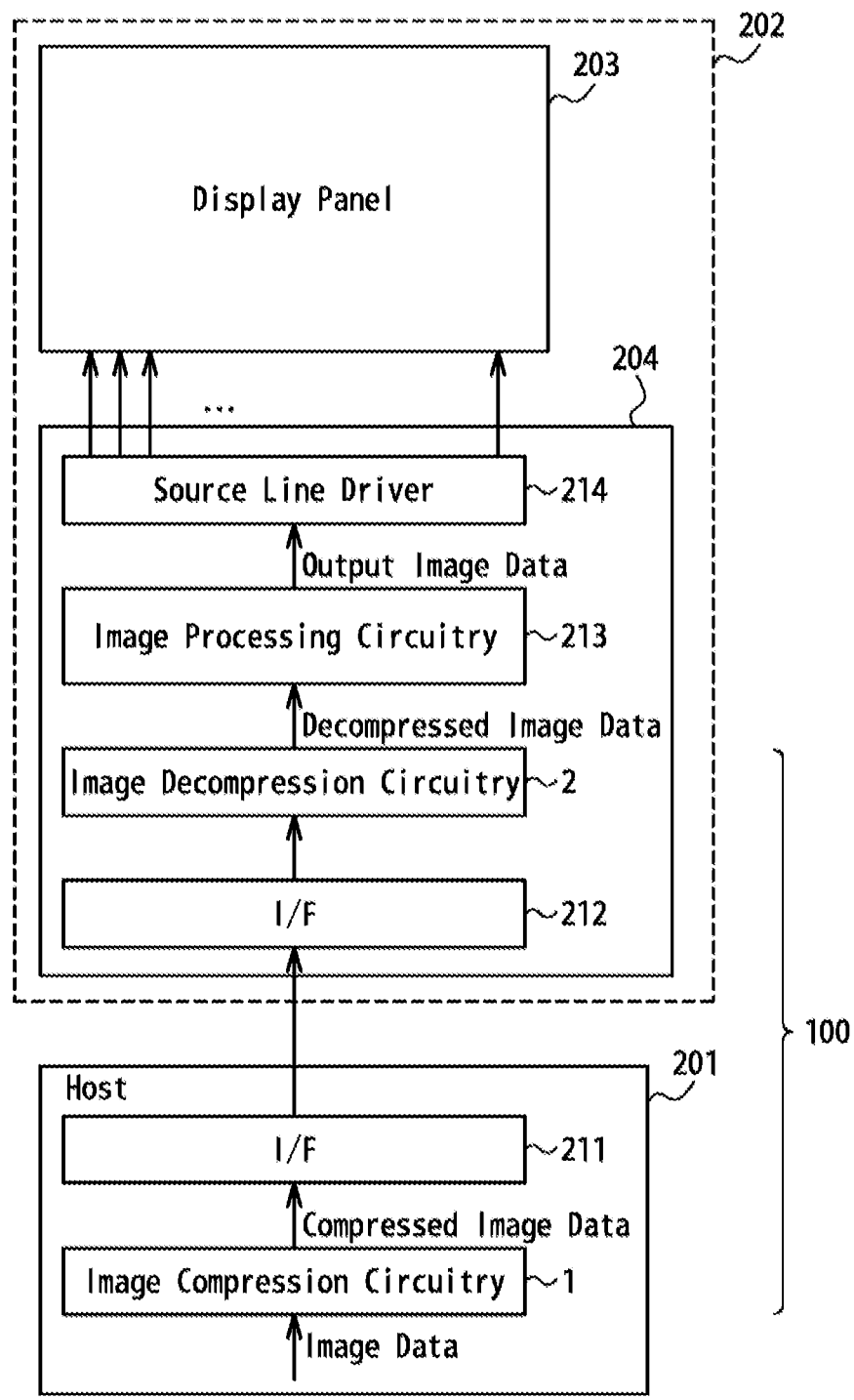
FIG. 20 illustrates example configurations of an image data compression/decompression system and a display device, according to one or more embodiments.

In one or more embodiments, as illustrated in FIG. 20, the image data compression/decompression system 100 is used for image data transfer from a host 201 to a display device 202. In one or more embodiments, the image data compression/decompression system 100 is configured to reduce the communication data amount from the host 201. The reduction in the communication data amount is effective for power consumption reduction, for example. In one or more embodiments, the host 201 comprises the above-described image compression circuitry 1 and an interface 211. In one or more embodiments, the image compression circuitry 1 is configured to generate a compressed image data by compressing an image data through the above-described compression method. In one or more embodiments, the interface 211 is configured to transmit the compressed image data to the display device 202. In one or more embodiments, the display device 202 comprises a display panel 203 and a display driver integrated circuit (IC) 204. In one or more embodiments, the display driver IC 204 comprises an interface 212, the above-described image decompression circuitry 2, image processing circuitry 213, and a source line driver 214. In one or more embodiments, the interface 212 is configured to receive the compressed image data from the host 201 and transfer the same to the image decompression circuitry 2. In one or more embodiments, the image decompression circuitry 2 is configured to generate a decompressed image data by decompressing the compressed image data received from the interface 212 by the above-described decompression method. In one or more embodiments, the image processing circuitry 213 is configured to generate an output image data by performing desired image processing on the decompressed image data. In one or more embodiments, the source line driver 214 is configured to drive source lines of the display panel 203 based on the output image data.

Figure 21:
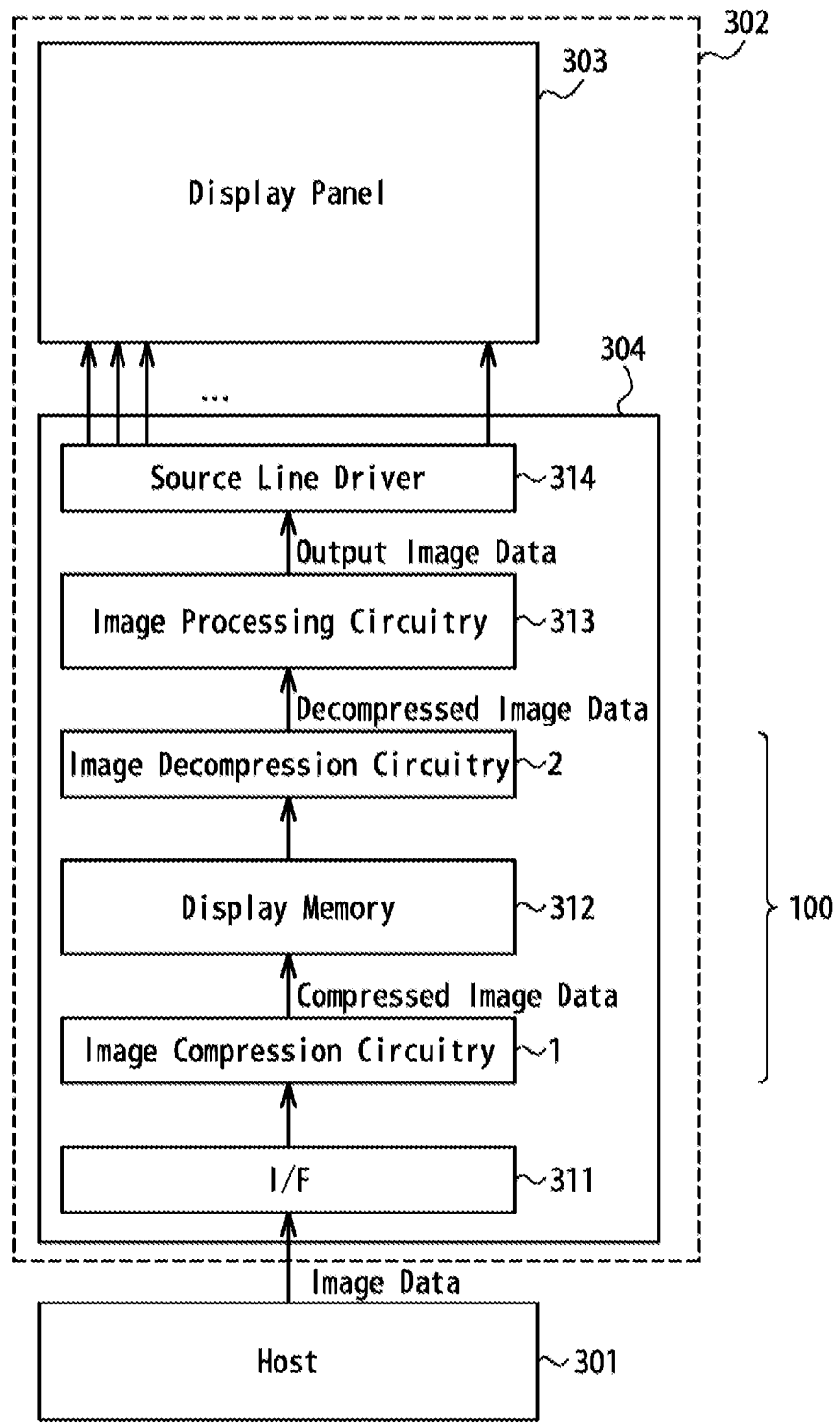
FIG. 21 illustrates example configurations of an image data compression/decompression system and a display device, according to one or more embodiments.

In one or more embodiments, as illustrated in FIG. 21, the image data compression/decompression system 100 is integrated in a display driver IC 304 configured to drive a display panel 303 in a display device 302, which is configured to display an image corresponding to an image data received from a host 301. In one or more embodiments, the image data compression/decompression system 100 is configured to reduce the capacity of a display memory integrated in the display driver IC 304. In one or more embodiments, the display driver IC 304 comprises, in addition to the above-described image compression circuitry 1 and image decompression circuitry 2, an interface 311, a display memory 312, image processing circuitry 313, and a source line driver 314. In one or more embodiments, the interface 311 is configured to receive an image data from the host 301 and transfer the same to the image compression circuitry 1. In one or more embodiments, the image compression circuitry 1 is configured to generate a compressed image data by compressing the image data received from the interface 311 through the above-described compression method. In one or more embodiments, the display memory 312 is configured to store the compressed image data. In one or more embodiments, the image decompression circuitry 2 is configured to generate a decompressed image data by decompressing the compressed image data read out from the display memory 312 through the above-described decompression method. In one or more embodiments, the image processing circuitry 313 is configured to generate an output image data by performing desired image processing on the decompressed image data. In one or more embodiments, the source line driver 314 is configured to drive source lines of the display panel 303 based on the output image data.

Embodiments of the present disclosure may be represented as follows.

(Item 1)

In one or more embodiments, an image compression method comprises: sequentially receiving a plurality of input blocks each comprising pixel data of a plurality of pixels; generating a plurality of first-stage compressed blocks by respectively compressing the plurality of input blocks; generating a plurality of first-stage decompressed blocks by decompressing the plurality of first-stage compressed blocks through corresponding decompression methods; and generating second-stage compressed blocks by respectively compressing the plurality of input blocks. Generating the second-stage compressed blocks comprises: generating one of the second-stage compressed blocks which corresponds to a first input block of the plurality of input blocks based on a first one of the plurality of first-stage decompressed blocks which corresponds to a preceding input block of the plurality of input blocks and a second one of the plurality of first-stage decompressed blocks which corresponds to a following input block, the preceding input block being received just before the first input block, and the following input block is received just after the first input block.

(Item 2)

In one or more embodiments, image decompression circuitry comprises: first-stage decompression circuitry configured to sequentially receive a plurality of compressed blocks generated through selected compression methods which are each selected from a plurality of compression methods and generate a plurality of first-stage decompressed blocks by decompressing the plurality of compressed blocks through a plurality of first-stage decompression methods corresponding to a plurality of first compression methods of the plurality of compression methods; first-stage selector circuitry configured to select first-stage-selected decompressed blocks from among the plurality of first-stage decompressed blocks; second-stage decompression circuitry configured to generate a plurality of second-stage decompressed blocks by decompressing the plurality of compressed blocks through a plurality of second-stage decompression methods corresponding to a plurality of second-stage compression methods of the plurality of compression methods; and second-stage selector circuitry configured to select second-stage-selected decompressed blocks from among the first-stage-selected decompressed blocks and the plurality of second-stage decompressed blocks and output the second-stage-selected decompressed blocks.

(Item 3)

In one or more embodiments, in the image decompression circuitry set forth in item 2, for example, at least one decompression method of the plurality of second-stage decompression method is configured to generate one of the second-stage decompressed blocks which corresponds to a first compressed block of the plurality of compressed blocks based on at least one of the plurality of first-stage-selected decompressed blocks which corresponds to at least one second compressed block of the plurality of compressed blocks, the at least one second compressed block being different from the first compressed block.

(Item 4)

In one or more embodiments, in the image decompression circuitry set forth in item 3, for example, the at least one second compressed block comprises: a preceding compressed block of the plurality of compressed blocks which is inputted to the first-stage decompression circuitry just before the first compressed block; and a following compressed block of the plurality of compressed blocks which is inputted to the first-stage decompression circuitry just after the first compressed block.

(Item 5)

In one or more embodiments, in the image decompression circuitry set forth in item 4, for example, the one of the second-stage decompressed blocks which corresponds to the first compressed block comprises, for each of a plurality of pixels of the one of the second-stage decompressed blocks, a decompressed pixel data of a pixel specified by an index included in the first compressed block, wherein the decompressed pixel data of the specified pixel is selected from decompressed pixel data of a plurality of pixels included in ones of the first-stage-selected decompressed blocks associated with the preceding compressed block and the following compressed block.

(Item 6)

In one or more embodiments, in the image decompression circuitry set forth in item 4, for example, the one of the second-stage decompressed blocks which corresponds to the first compressed block comprises, for each of a plurality of first pixels corresponding to the one of the second-stage decompressed blocks, a decompressed pixel data of a pixel specified by an index included in the first compressed block, wherein the decompressed pixel data of the specified pixel is selected from decompressed pixel data of a plurality of second pixels included in ones of the first-stage-selected decompressed blocks associated with the preceding compressed block and the following compressed block, the plurality of second pixels being in the same line as the plurality of first pixels.

(Item 7)

In one or more embodiments, in the image decompression circuitry set forth in any of items 2 to 6, for example, the first-stage decompression circuitry comprises: a plurality of first-stage decompression submodules configured to perform the plurality of first decompression methods on the plurality of compressed blocks distributed from a first pipelined storage. The plurality of compressed blocks are distributed to the plurality of first-stage decompression submodules with delays based on the plurality of first-stage compression methods performed by the plurality of first-stage compression submodules.

(Item 8)

In one or more embodiments, in the image decompression circuitry set forth in any of items 2 to 7, the second-stage decompression circuitry comprises a plurality of second-stage decompression submodules configured to perform the plurality of second decompression methods on the plurality of compressed blocks distributed from a second pipelined storage based on the first-stage-selected decompressed blocks distributed from the second pipelined storage. The plurality of compressed blocks and the first-stage-selected decompressed blocks are distributed to the plurality of second-stage decompression submodules with delays based on the plurality of second-stage compression methods performed by the plurality of second-stage compression submodules.

(Item 9)

In one or more embodiments, image decompression circuitry comprises: first-stage decompression circuitry configured to sequentially receive a plurality of compressed blocks and generate a plurality of first-stage decompressed blocks by decompressing the plurality of compressed blocks; and second-stage decompression circuitry configured to sequentially receive the plurality of compressed blocks and generate a plurality of second-stage decompressed blocks by decompressing the plurality of compressed blocks. The second-stage decompression circuitry is further configured to generate one of the second-stage decompressed blocks which corresponds to a first compressed block of the plurality of compressed blocks based on a first one of the plurality of first-stage decompressed blocks which corresponds to a preceding compressed block of the plurality of compressed blocks and a second one of the plurality of first-stage decompressed blocks which corresponds to a following compressed block of the plurality of compressed blocks. The preceding compressed block is inputted to the first-stage decompression circuitry just before the first compression block, and the following compressed block is inputted to the first-stage decompression circuitry just after the first compression block.

(Item 10)

In one or more embodiments, in the image decompression circuitry set forth in item 9, for example, the one of the second-stage decompressed blocks which corresponds to the first compressed block comprises, for each of a plurality of pixels of the one of the second-stage decompressed blocks, a decompressed pixel data of a pixel specified by an index included in the first compressed block, wherein the decompressed pixel data of the specified pixel is selected from decompressed pixel data of a plurality of pixels included in ones of the first-stage-selected decompressed blocks associated with the preceding compressed block and the following compressed block.

(Item 11)

In one or more embodiments, in the image decompression circuitry set forth in item 9, for example, the one of the second-stage decompressed blocks which corresponds to the first compressed block comprises, for each of a plurality of first pixels corresponding to the one of the second-stage decompressed blocks, a decompressed pixel data of a pixel specified by an index included in the first compressed block, the decompressed pixel data of the specified pixel being selected from decompressed pixel data of a plurality of second pixels included in ones of the first-stage selected decompressed blocks associated with the preceding compressed block and the following compressed block, the plurality of second pixels being in the same line as the plurality of first pixels.

(Item 12)

In one or more embodiments, an image decompression method comprises: sequentially receiving a plurality of compressed blocks each generated through a selected one of a plurality of compression methods; generating a plurality of first-stage decompressed blocks by decompressing the plurality of compressed blocks through a plurality of first decompression methods corresponding to a plurality of first compression methods of the plurality of compression methods; selecting a first-stage-selected decompressed block from among the plurality of first-stage decompressed blocks; generating a plurality of second-stage decompressed blocks by decompressing the plurality of compressed blocks through a plurality of second decompression methods corresponding to a plurality of second compression methods of the plurality of compression methods; selecting a second-stage-selected decompressed block from among the first-stage-selected decompressed block and the plurality of second-stage decompressed blocks; and outputting the second-stage-selected decompressed block.

(Item 13)

In one or more embodiments, an image decompression method comprises: sequentially receiving a plurality of compressed blocks; generating a plurality of first-stage decompressed blocks by decompressing the plurality of compressed blocks; and generating a plurality of second-stage decompressed blocks by decompressing the plurality of compressed blocks. Generating the plurality of second-stage decompressed blocks comprises: generating one of the plurality of second-stage decompressed blocks which corresponds to a first compressed block of the plurality of compressed blocks based on a first one of the first-stage decompressed blocks which corresponds to a preceding compressed block and a second one of the first-stage decompressed blocks which corresponds to a following compressed block. The preceding compressed block being received just before the first compressed block and the following compressed block being received just after the first compressed block.

(Item 14)

In one or more embodiments, a display driver comprises: image decompression circuitry configured to decompress a compressed image data; and drive circuitry. The compressed image data comprises a plurality of compressed blocks each generated by a selected compression method of a plurality of compression methods. The image decompression circuitry comprises: first-stage decompression circuitry configured to sequentially receive the plurality of compressed blocks and generate a plurality of first-stage decompressed blocks by decompressing the plurality of compressed blocks through a plurality of first decompression methods corresponding to a plurality of first compression methods of the plurality of compression methods; first-stage selector circuitry configured to select a first-stage-selected decompression block from among the plurality of first-stage decompressed blocks; second-stage decompression circuitry configured to generate a plurality of second-stage decompressed blocks by decompressing the plurality of compressed blocks through a plurality of second decompression methods corresponding to a plurality of second compression methods of the plurality of compression methods; and second-stage selector circuitry configured to select a second-stage-selected decompression block from among the first-stage-selected decompressed block and the plurality of second-stage decompressed blocks and output the second-stage-selected decompression block. The drive circuitry is configured to drive a display panel based on the second-stage-selected decompression block.

(Item 15)

In one or more embodiments, the display driver set forth in item 14, for example, further comprises image compression circuitry configured to generate the compressed image data by compressing an original image data; and a display memory configured to store the compressed image data generated by the image compression circuitry. The image decompression circuitry is further configured to receive the compressed image data from the display memory.

(Item 16)

In one or more embodiments, a display panel drive method comprises: sequentially receiving a plurality of compressed blocks; generating a plurality of first-stage decompressed blocks by decompressing the plurality of compressed blocks; generating a plurality of second-stage decompressed blocks by decompressing the plurality of compressed blocks; and driving a display panel based on the plurality of second-stage decompressed blocks. Generating the plurality of second-stage decompressed blocks comprises: generating one of the plurality of second-stage decompressed blocks which corresponds to a first compressed block of the plurality of compressed blocks based on a first one of the first-stage decompressed blocks which corresponds to a preceding compressed block and a second one of the first-stage decompressed blocks which corresponds to a following compressed block. The preceding compressed block is received just before the first compressed block and the following compressed block is received just after the first compressed block.

Although various embodiments of this disclosure have been specified described herein, a person skilled in the art would appreciate that the technologies disclosed herein may be implemented with various modifications.

What is claimed is:

1. Image compression circuitry, comprising:
   first-stage compression circuitry configured to:
   sequentially receive a plurality of input blocks each comprising pixel data for a plurality of pixels;

generate a plurality of first-stage compressed blocks by compressing the plurality of input blocks through a plurality of first-stage compression methods; and generate a plurality of first-stage decompressed blocks by decompressing the plurality of first-stage compressed blocks;

first-stage selector circuitry configured to:

select first-stage-selected decompressed blocks from among the plurality of first-stage decompressed blocks; and select first-stage-selected compressed blocks corresponding to the first-stage- selected decompressed blocks from among the plurality of first-stage compressed blocks;

second-stage compression circuitry configured to:

generate a plurality of second-stage compressed blocks by compressing the plurality of input blocks through a plurality of second-stage compression methods, wherein the plurality of second-stage compression methods is different than the plurality of first-stage compression methods; and generate a plurality of second-stage decompressed blocks by decompressing the plurality of second-stage compressed blocks, wherein the second-stage compression circuitry is different than the first-stage compression circuitry; and second-stage selector circuitry configured to:

select second-stage-selected compressed blocks from among the first-stage- selected compressed blocks and the plurality of second-stage compressed blocks; and output the second-stage-selected compressed blocks.

2. The image compression circuitry according to claim 1, wherein at least one of the plurality of second-stage compression methods is configured to generate one of the plurality of second-stage compressed blocks corresponding to a first input block of the plurality of input blocks, wherein generating one of the plurality of second-stage compressed blocks is based on at least one of the first-stage-selected decompressed blocks corresponding to at least one second input block of the plurality of input blocks, and wherein the at least one second input block is different from the first input block.

3. The image compression circuitry according to claim 2, wherein the at least one second input block comprises:

a preceding input block of the plurality of input blocks which is inputted to the first-stage compression circuitry before the first input block; and a following input block of the plurality of input blocks which is inputted to the first-stage compression circuitry after the first input block.

4. The image compression circuitry according to claim 3, wherein the one of the second-stage compressed blocks comprises:

indexes indicating which decompressed pixel data included in one or more of the plurality of first-stage decompressed blocks exhibits a highest similarity with pixel data of one of the plurality of input blocks, wherein one or more of the plurality of first-stage decompressed blocks correspond to the preceding input block and following input block.

5. The image compression circuitry according to claim 3, wherein the one of the second-stage compressed blocks comprises:

indexes indicating which decompressed pixel data of a plurality of first pixels included in one or more of the plurality of first-stage decompressed blocks exhibits a highest similarity with pixel data of a second pixel of the one of the plurality of input blocks, wherein the plurality of first pixels and the second pixel are in a same line, and wherein the one or more of the plurality of first-stage decompressed blocks correspond to the preceding input block and the following input block.

6. The image compression circuitry according to claim 1, wherein the plurality of first-stage compression methods is configured to generate each of the plurality of first-stage compressed blocks from a corresponding one of the plurality of input blocks without referring to a different one of the plurality of input blocks.

7. The image compression circuitry according to claim 1, wherein the first-stage selector circuitry is further configured to select the first-stage-selected decompressed blocks based on a comparison of the plurality of first-stage decompressed blocks with the plurality of input blocks.

8. The image compression circuitry according to claim 1, wherein the second-stage selector circuitry is further configured to select the second-stage-selected compressed blocks based on a comparison of the first-stage-selected decompressed blocks and the plurality of second-stage decompressed blocks with the plurality of input blocks.

9. The image compression circuitry according to claim 1, wherein compression methods of the plurality of first-stage compression methods and the plurality of second-stage compression methods have different latencies.

10. The image compression circuitry according to claim 9, wherein the first-stage compression circuitry and the second-stage compression circuitry are configured to supply different delays to respective input blocks to absorb variations in latency.

11. The image compression circuitry according to claim 1, wherein, unlike the plurality of first-stage compression methods, the plurality of second-stage compression methods, for compressing a respective input block, refer to at least one first-stage selected decompressed block corresponding to a neighboring input block of the respective input block.

12. The image compression circuitry according to claim 1, wherein the first-stage selector circuitry is configured to select a first-stage compression method of the plurality of first-stage compression methods associated with a first-stage decompressed block with a highest similarity or with a least error.

13. The image compression circuitry according to claim 12, wherein the first-stage selector circuitry comprises a comparator configured to perform the selection of the first-stage compression method.

14. The image compression circuitry according to claim 12, wherein the selection of the first-stage compression method is based on calculated errors between a respective input block and respective first-stage decompressed blocks.

15. Image compression circuitry, comprising:

first-stage compression circuitry configured to:

sequentially receive a plurality of input blocks each comprising pixel data of a plurality of pixels;

generate a plurality of first-stage compressed blocks by compressing the plurality of input blocks; and generate a plurality of first-stage decompressed blocks by decompressing the plurality of first-stage compressed blocks; and second-stage compression circuitry configured to:
sequentially receive the plurality of input blocks and generate a plurality of second-stage compressed blocks by compressing the plurality of input blocks; and
generate one of the second-stage compressed blocks corresponding to a first input block of the plurality of input blocks,
wherein generating one of the second-stage compressed blocks is based at least on: a first one of the plurality of first-stage decompressed blocks corresponding to a preceding input block of the plurality of input blocks, and a second one of the plurality of first-stage decompressed blocks corresponding to a following input block of the plurality of input blocks,
wherein the preceding input block is inputted to the first-stage compression circuitry before the first input block, and
wherein the following input block is inputted to the first-stage compression circuitry after the first input block,
wherein the second-stage compression circuitry is different than the first-stage compression circuitry.

16. The image compression circuitry according to claim 15, wherein the one of the second-stage compressed blocks comprises:
indexes indicating which decompressed pixel data of the plurality of pixels included in one or more of the plurality of first-stage decompressed blocks exhibits a highest similarity with corresponding pixel data of an adjacent input block.

17. The image compression circuitry according to claim 15, wherein the one of the second-stage compressed blocks comprises:
indexes indicating which decompressed pixel data of a plurality of first pixels included in one or more of the plurality of first-stage decompressed blocks exhibits a highest similarity with corresponding pixel data of pixels in a same line.

18. The image compression circuitry according to claim 15, wherein the first-stage compression circuitry is further configured to generate each of the plurality of first-stage compressed blocks from a corresponding one of the plurality of input blocks without referring to a different one of the plurality of input blocks.

19. An image compression method, comprising:
sequentially receiving a plurality of input blocks each comprising pixel data of a plurality of pixels;
generating a plurality of first-stage compressed blocks by compressing the plurality of input blocks through a plurality of first-stage compression methods;
generating a plurality of first-stage decompressed blocks by decompressing the plurality of first-stage compressed blocks;
selecting first-stage-selected decompressed blocks from among the plurality of first- stage decompressed blocks;
selecting first-stage-selected compressed blocks corresponding to the first-stage- selected decompressed blocks from among the plurality of first-stage compressed blocks;
generating a plurality of second-stage compressed blocks by compressing the plurality of input blocks through a plurality of second-stage compression methods, wherein the plurality of second-stage compression methods is different than the plurality of first-stage compression methods;
generating a plurality of second-stage decompressed blocks by decompressing the plurality of second-stage compressed blocks;
selecting second-stage-selected compressed blocks from among the first-stage-selected compressed blocks and the plurality of second-stage compressed blocks based on the first- stage-selected decompressed blocks and the plurality of second-stage decompressed blocks; and
outputting the second-stage-selected compressed blocks,
wherein the plurality of first-stage compression methods is different than the plurality of second-stage compression methods.

20. The image compression method according to claim 19, wherein at least one of the plurality of second-stage compression methods is configured to generate one of the plurality of second-stage compressed blocks corresponding to a first input block of the plurality of input blocks,
wherein generating one of the plurality of second-stage compressed blocks is based on at least one of the first-stage-selected decompressed blocks corresponding to at least one second input block of the plurality of input blocks, and
wherein the at least one second input block is different from the first input block.

21. The image compression method according to claim 20, wherein the at least one second input block comprises:
a preceding input block of the plurality of input blocks which is received before the first input block; and
a following input block of the plurality of input blocks which is received after the first input block.

22. The image compression method according to claim 21, wherein the one of the second-stage compressed blocks comprises:
indexes indicating which decompressed pixel data of one or more of the plurality of first-stage decompressed blocks exhibits a highest similarity with pixel data of one of the plurality of input blocks, wherein the one or more of the plurality of first-stage decompressed blocks corresponds to the preceding input block and the following input block.

23. The image compression method according to claim 21, wherein the one of the second-stage compressed blocks comprises:
indexes indicating which decompressed pixel data of a plurality of first pixels included in one or more of the plurality of first-stage decompressed blocks exhibits a highest similarity with pixel data of a second pixel of the one of the plurality of input blocks, wherein the plurality of first pixels and the second pixel are in a same line, and wherein the one or more of the plurality of first-stage decompressed blocks correspond to the preceding input block and the following input block.

24. The image compression method according to claim 19, wherein the plurality of first-stage compression methods is configured to generate each of the plurality of first-stage compressed blocks from a corresponding one of the plurality of input blocks without referring to a different one of the plurality of input blocks.

25. The image compression method according to claim 19, further comprising selecting the first-stage-selected decompressed blocks based on a comparison of the plurality of first-stage decompressed blocks with the plurality of input blocks.

26. The image compression method according to claim 19, further comprising selecting the second-stage-selected compressed blocks based on a comparison of the first-stageselected decompressed blocks and the plurality of second-stage decompressed blocks with the plurality of input blocks.

\* \* \* \* \*